US011733054B2

(12) United States Patent
Yang et al.

(10) Patent No.: US 11,733,054 B2
(45) Date of Patent: Aug. 22, 2023

(54) SYSTEMS AND METHODS FOR IMPLEMENTING OCCLUSION REPRESENTATIONS OVER ROAD FEATURES

(71) Applicant: Motional AD LLC, Boston, MA (US)

(72) Inventors: Yifan Yang, Pittsburgh, PA (US); Scott D. Pendleton, Singapore (SG); Giancarlo Baldan, Somerville, MA (US)

(73) Assignee: Motional AD LLC, Boston, MA (US)

( * ) Notice: Subject to any disclaimer, the term of this patent is extended or adjusted under 35 U.S.C. 154(b) by 190 days.

(21) Appl. No.: 17/119,259

(22) Filed: Dec. 11, 2020

(65) Prior Publication Data

US 2022/0187090 A1 Jun. 16, 2022

(51) Int. Cl.
*G01C 21/34* (2006.01)
*G01C 21/36* (2006.01)
(Continued)

(52) U.S. Cl.
CPC ....... *G01C 21/3476* (2013.01); *B60W 60/001* (2020.02); *G01C 21/3679* (2013.01);
(Continued)

(58) Field of Classification Search
CPC ............ G01C 21/3476; G01C 21/3889; G01C 21/3679; G01C 21/3691; B60W 60/001;
(Continued)

(56) References Cited

U.S. PATENT DOCUMENTS 6,768,813 B1 7/2004 Nakayama
8,605,946 B2 12/2013 Iwasaki et al.
(Continued)

FOREIGN PATENT DOCUMENTS

KR  1020170129251  11/2017
WO  WO 2020/146659  7/2020

OTHER PUBLICATIONS

Bertozzi et al., "Stereo inverse perspective mapping: theory and applications" Image and Vision Computing, 1999, 16:585-590.
(Continued)

*Primary Examiner* — Faris S Almatrahi
*Assistant Examiner* — Sahar Motazedi
(74) *Attorney, Agent, or Firm* — Fish & Richardson P.C.

(57) ABSTRACT

Among other things, techniques are described for implementing occlusion representations over road features. In general, one innovative aspect of the subject matter described in this specification can be embodied in methods that include: obtaining area information of at least one area of interest for a vehicle, identifying occlusion data associated with the at least one area of interest, determining occlusion information associated with the at least one area of interest based on the area information and the occlusion data, providing the occlusion information for planning a route for the vehicle, and operating the vehicle in accordance with the planned route. The occlusion data includes data associated with the occlusion information, and the occlusion information has a smaller data size than the occlusion data.

20 Claims, 17 Drawing Sheets

(51) Int. Cl.
  *G01C 21/00* (2006.01)
  *B60W 60/00* (2020.01)
  *G06V 20/56* (2022.01)
  *G06F 18/25* (2023.01)
(52) U.S. Cl.
  CPC ..... *G01C 21/3691* (2013.01); *G01C 21/3889* (2020.08); *B60W 2552/00* (2020.02); *G06F 18/25* (2023.01); *G06V 20/56* (2022.01)
(58) Field of Classification Search
  CPC .. B60W 2552/00; G06V 20/56; G06K 9/6288
  See application file for complete search history.

(56) References Cited

U.S. PATENT DOCUMENTS

| | | | |
|---|---|---|---|
| 8,611,591 B2 | 12/2013 | Coffman et al. | |
| 9,434,382 B1 | 9/2016 | Prokhorov et al. | |
| 9,476,970 B1 | 10/2016 | Fairfield et al. | |
| 9,501,932 B2 | 11/2016 | Sakai et al. | |
| 9,600,768 B1 | 3/2017 | Ferguson | |
| 9,645,577 B1 | 5/2017 | Frazzoli et al. | |
| 9,836,895 B1 | 12/2017 | Nygaard et al. | |
| 10,037,036 B2 | 7/2018 | Nilsson et al. | |
| 10,095,234 B2 | 10/2018 | Frazzoli et al. | |
| 10,234,864 B2 | 3/2019 | Frazzoli et al. | |
| 11,400,925 B2 * | 8/2022 | Frazzoli | G06V 20/58 |
| 2006/0155464 A1 | 7/2006 | Smartt | |
| 2007/0061074 A1 | 3/2007 | Safoutin | |
| 2008/0266168 A1 | 10/2008 | Aso et al. | |
| 2009/0024357 A1 | 1/2009 | Aso et al. | |
| 2009/0058677 A1 | 3/2009 | Tseng et al. | |
| 2009/0237263 A1 | 9/2009 | Sawyer | |
| 2011/0231095 A1 | 9/2011 | Nakada et al. | |
| 2012/0140039 A1 | 6/2012 | Ota | |
| 2012/0275524 A1 | 11/2012 | Lien et al. | |
| 2013/0223686 A1 | 8/2013 | Shimizu | |
| 2013/0304349 A1 | 11/2013 | Davidson | |
| 2013/0328916 A1 | 12/2013 | Arikan et al. | |
| 2014/0088855 A1 | 3/2014 | Ferguson | |
| 2015/0120125 A1 | 4/2015 | Thomson et al. | |
| 2016/0047657 A1 | 2/2016 | Caylor et al. | |
| 2016/0109245 A1 | 4/2016 | Denaro | |
| 2016/0137206 A1 | 5/2016 | Chandraker et al. | |
| 2016/0147921 A1 | 5/2016 | VanHolme | |
| 2016/0266581 A1 | 9/2016 | Dolgov et al. | |
| 2016/0282874 A1 | 9/2016 | Kurata et al. | |
| 2016/0327953 A1 | 11/2016 | Nilsson et al. | |
| 2017/0008521 A1 | 1/2017 | Braunstein et al. | |
| 2017/0262750 A1 | 9/2017 | Kozuka et al. | |
| 2017/0291608 A1 | 10/2017 | Engel et al. | |
| 2017/0327128 A1 | 11/2017 | Denaro | |
| 2017/0341652 A1 | 11/2017 | Sugawara et al. | |
| 2017/0345311 A1 | 11/2017 | Sugiura et al. | |
| 2017/0345321 A1 | 11/2017 | Cross et al. | |
| 2017/0369051 A1 | 11/2017 | Sakai et al. | |
| 2018/0113459 A1 | 4/2018 | Bennie et al. | |
| 2018/0114442 A1 | 4/2018 | Minemura et al. | |
| 2018/0118144 A1 * | 5/2018 | Yoshihira | B60R 21/0132 |
| 2018/0120859 A1 | 5/2018 | Eagelberg et al. | |
| 2018/0217233 A1 | 8/2018 | Lee | |
| 2018/0259967 A1 * | 9/2018 | Frazzoli | B60W 30/095 |
| 2018/0259968 A1 | 9/2018 | Frazzoli et al. | |
| 2018/0259969 A1 | 9/2018 | Frazzoli et al. | |
| 2019/0018421 A1 | 1/2019 | Frazzoli et al. | |
| 2020/0225669 A1 * | 7/2020 | Silva | B60W 60/0011 |
| 2020/0225672 A1 * | 7/2020 | Silva | G01S 17/89 |
| 2020/0278681 A1 | 9/2020 | Gier et al. | |
| 2021/0064889 A1 * | 3/2021 | Iglesias | B60W 30/146 |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, p. 387-392.

Himmelsback et al., "Fast Segmentation of 3D Point Clouds for Ground Vehicles," IEEE Intelligent Vehicles Symposium, Jul. 21-24, 2010, 6 pages.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

Shackelford et al., "Urban Road Network Extraction from High-Resolution Multispectral Data," 2nd GRSS/ISPRS Joint Workshop on Remote Sensing and Data Fusion over Urban Areas, May 23, 2003, pp. 142-146.

\* cited by examiner

SYSTEMS AND METHODS FOR IMPLEMENTING OCCLUSION REPRESENTATIONS OVER ROAD FEATURES

FIELD OF THE INVENTION

This description relates to systems and methods for implementing occlusion representations over road features.

BACKGROUND

In making driving decisions, typical autonomous vehicle (AV) systems take account of objects-such as other vehicles and obstacles-that the AV system knows are in the environment of the AV, either because sensor systems on the AV observes the objects, or because the objects are identified by maps or other data sources. For making driving decisions, the AV systems may maintain models that include the objects known to be in the AV's environment. Challenges to good driving decisions also arise from vehicles and obstacles that the AV cannot observe or perceive and does not otherwise observe or know to exist based on available data.

DETAILED DESCRIPTION

Figure 1:
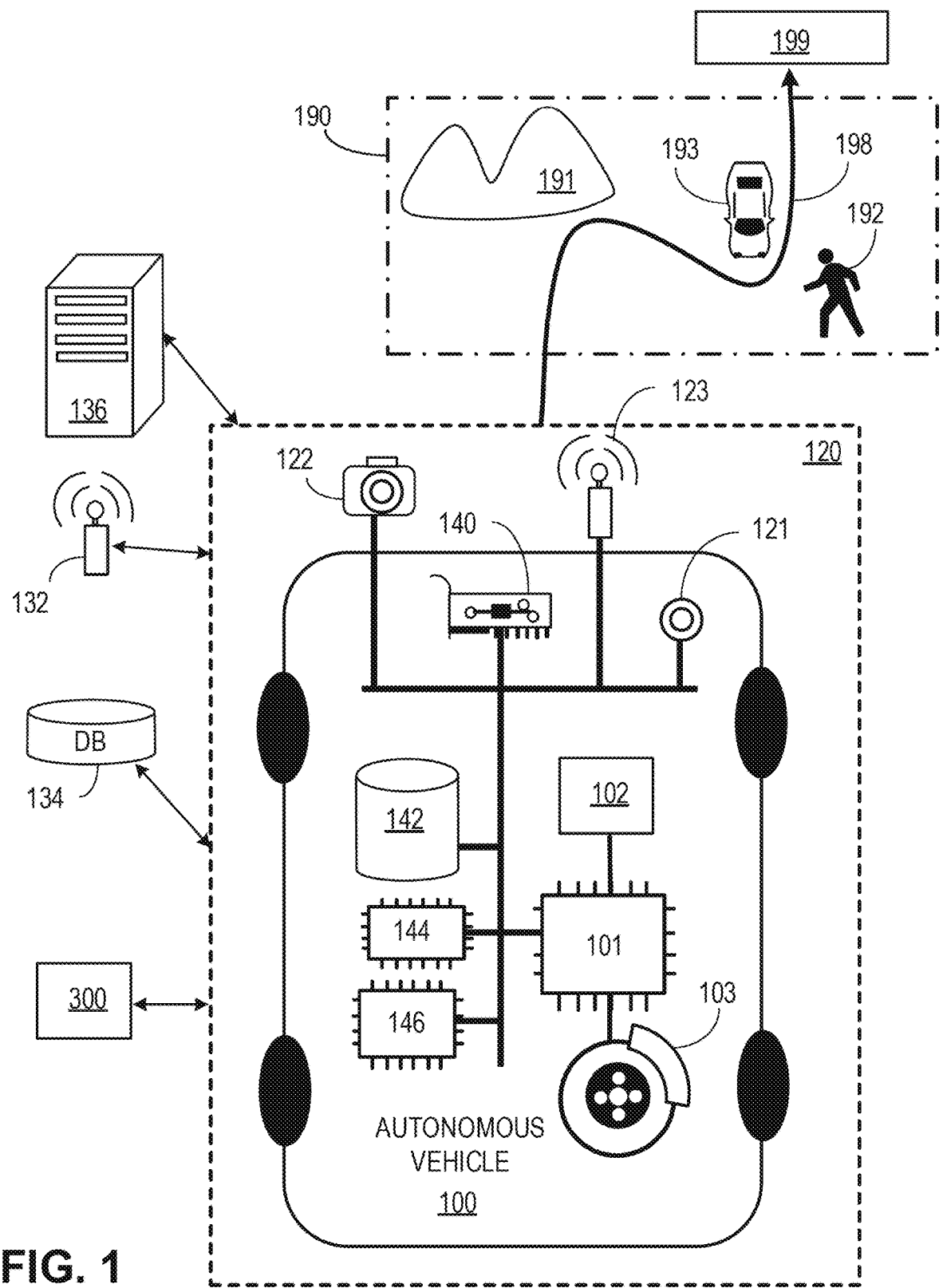
FIG. 1 shows an example of an autonomous vehicle (AV) having autonomous capability.

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Architecture for Implementing Occlusion Representations over Road Features
8. Processes for Implementing Occlusion Representations over Road Features

General Overview

A vehicle (e.g., an autonomous vehicle) can be configured to address occlusion and visibility uncertainty over critical road features (e.g., stop sign areas, intersections, travelled/adjacent lanes, or crosswalks) for safe decision making. Particularly, a perception module of the vehicle can provide computationally efficient occlusion information in areas of interest (e.g., precedence areas such as incoming cross traffic lane areas or stop areas such as stop sign areas nearby the vehicle) to a planning module of the vehicle for fast and safe route planning. For example, instead of providing full occlusion data (e.g., 2D or 3D data) from dense occlusion maps, the perception module can provide an efficient representation of the occlusion information by assigning respective levels of occlusion to a series of coarsely partitioned segments in the areas of interest (e.g., segmentation of incoming lanes along traffic flow direction). Moreover, the perception module can update the occlusion information by temporal filtering to further increase visibility of the planning module for route planning. The perception module can also periodically update the occlusion information for the vehicle selectively within the current areas of interest, e.g., based on a current route from the planning module.

Some of the advantages of these techniques are as follows. First, the techniques can provide only known features and exclude unknown features (e.g., without reporting type classifications of car vs cyclist, or footprint size for occluded objects), which can add clarity and guard against misuse of faked attributes in downstream decision making. Second, the techniques only need to deal with coarse 1D occlusion information, which is more memory efficient compared to using the full occlusion mapping data (2D or 3D) and results in lower bandwidth and higher transmission speed between different modules. Third, the techniques can leverage AV's planned route and prior map information to focus on locations that matter most, which makes the perception module more computationally efficient. Fourth, the techniques can apply temporal filtering, e.g., from previously observed adjacent sections of roadway, to provide valuable information even when the static AV is occluded by a static object. Fifth, the techniques can also evaluate occlusions of adjacent lanes in preparation for lane change. Sixth, the techniques can further add estimated likelihood of occupancy and expected velocity range in occluded grid cells for safe decision making. Finally, the techniques can not only use lane segment breakdown to report occlusion over lane/lane connectors relevant to planners, but also apply to lanes ahead for lane keeping, e.g., to handle hills, curvy roads or inclement weather reduced visibility range.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

It will be understood that in various real-world embodiments it may take a system a finite amount of processing time to update data or display as a result of modification of data, and so as used herein the concept of "real-time" or "real time" is used to indicate a time-frame in which two events happen close together with the assumption that that finite lag may occur due to the capabilities of the processor of the electronic system. In some embodiments, the lag may be on the order of less than or equal to approximately 1 second and may be, for example 1 second, 0.5 seconds, or on the order of a few milliseconds to tens of milliseconds. However, it will be understood that these timelines are intended as examples and, in other embodiments, the lag may be greater or smaller than described.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
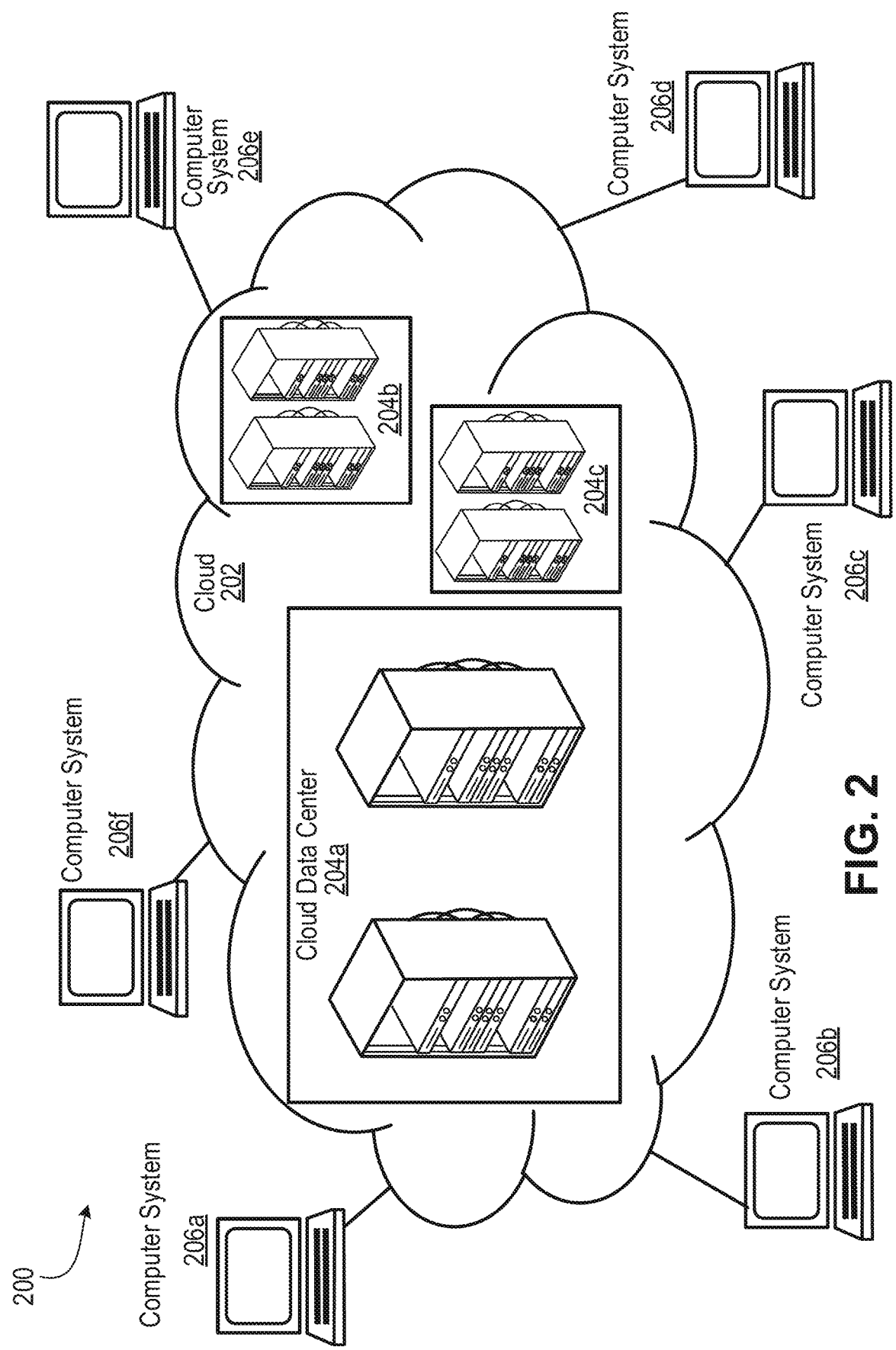
FIG. 2 shows an example "cloud" computing environment.

FIG. 2 shows an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
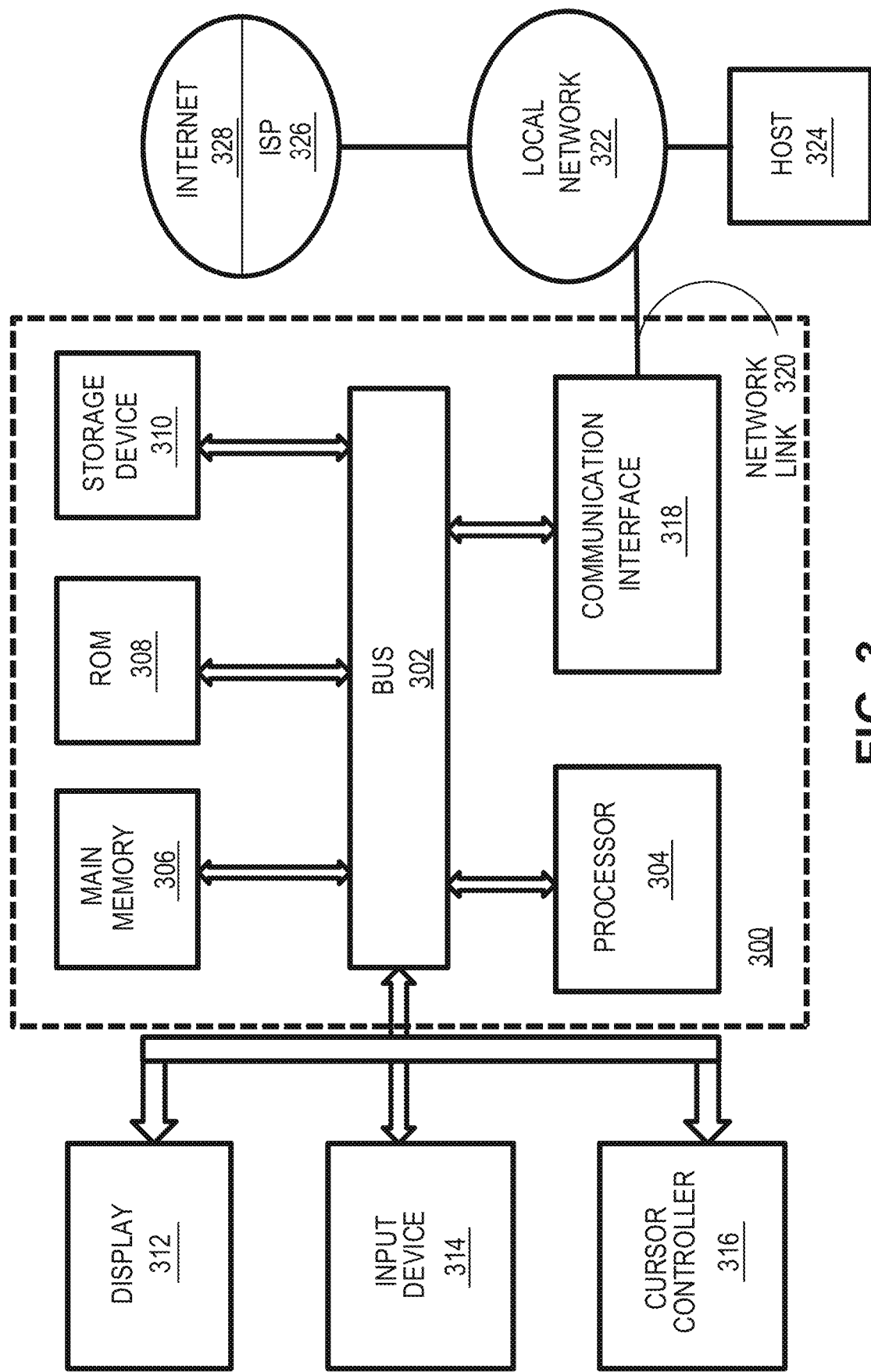
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and sends the instructions over a telephone line using a modem. A modem local to the computer system 300 receives the data on the telephone line and uses an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
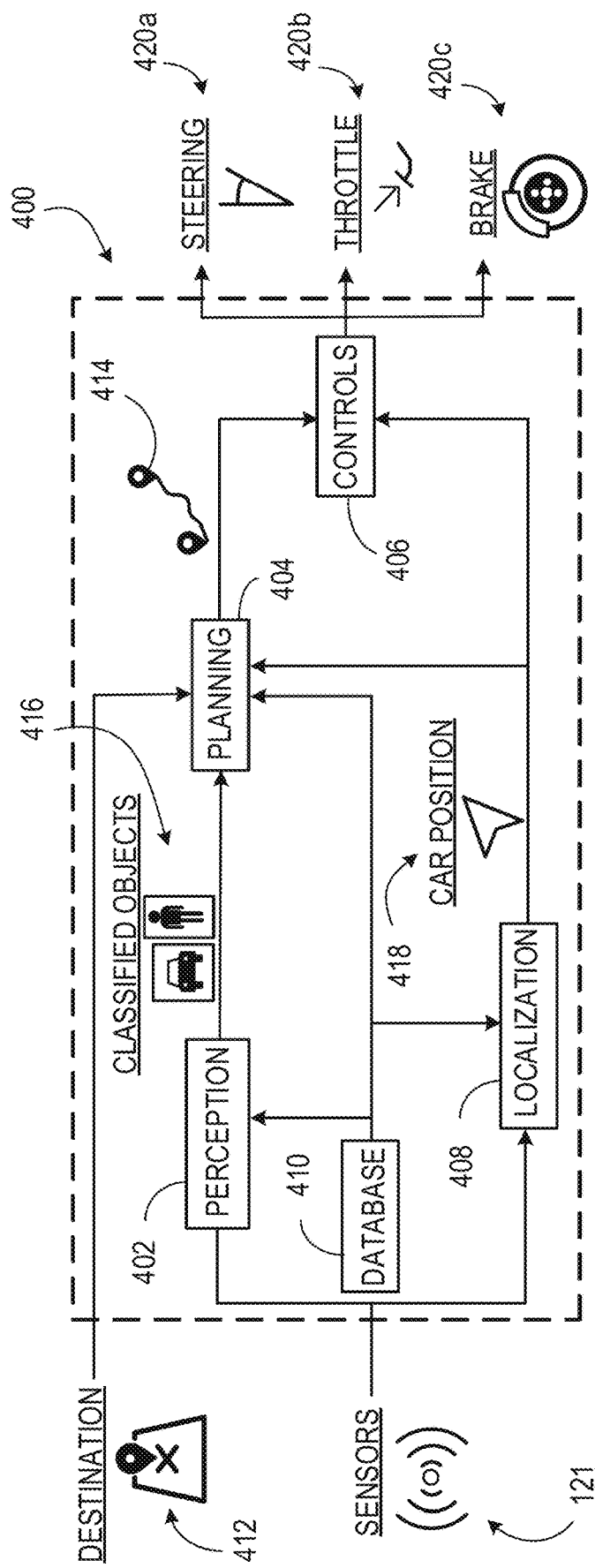
FIG. 4 shows an example architecture for an AV.

FIG. 4 shows an example architecture 400 for an AV (e.g., the vehicle 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the vehicle 100. Together, the modules 402, 404, 406, 408, and 410 can be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the vehicle 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420*a-c* (e.g., steering, throttling, braking, ignition) of the AV in a manner that will cause the vehicle 100 to travel the trajectory 414 to the destination 412. For example, if the trajectory 414 includes a left turn, the control module 406 will operate the control functions 420*a-c* in a manner such that the steering angle of the steering function will cause the vehicle 100 to turn left and the throttling and braking will cause the vehicle 100 to pause and wait for passing pedestrians or vehicles before the turn is made.

Autonomous Vehicle Inputs

Figure 5:
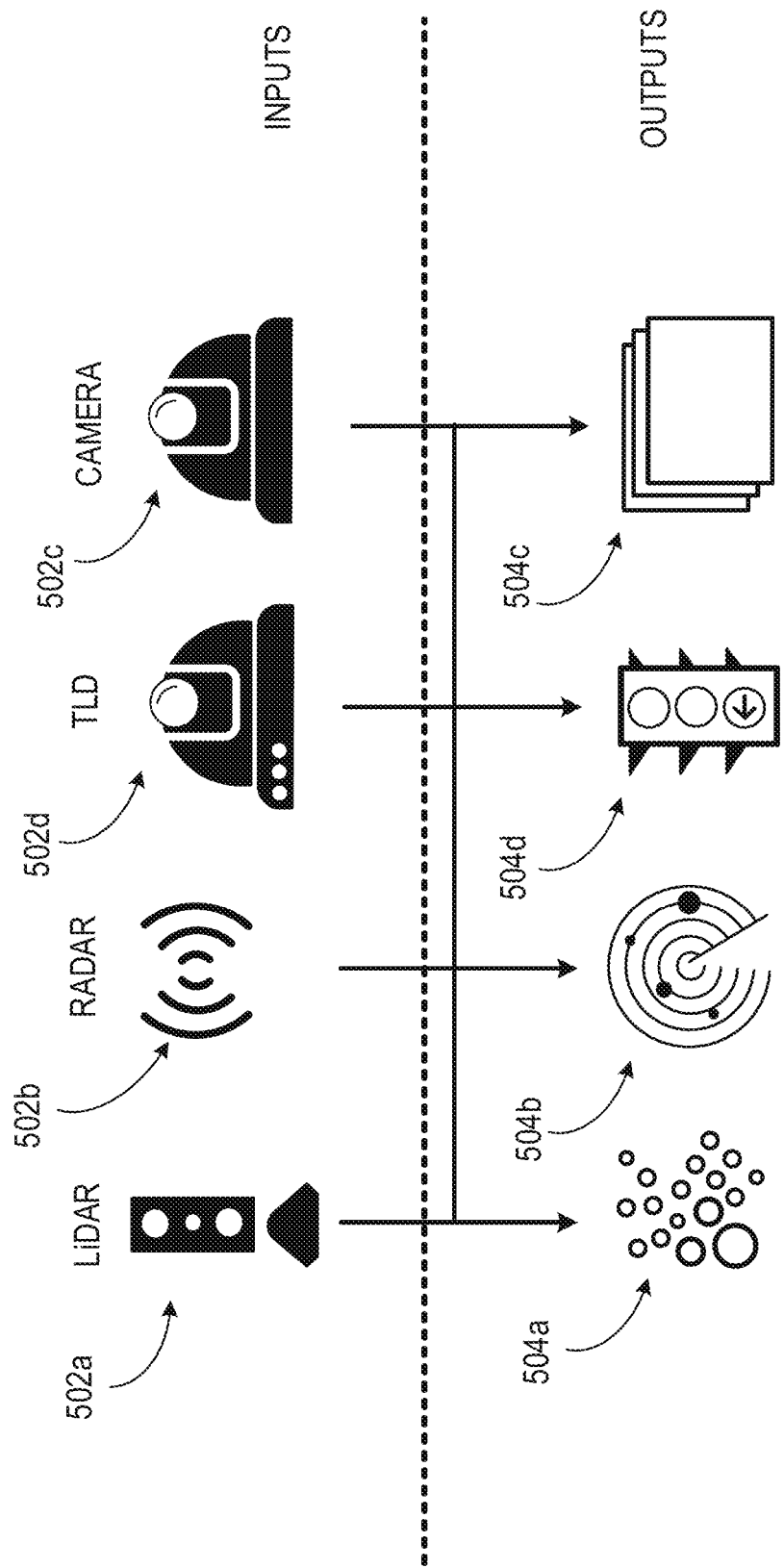
FIG. 5 shows an example of inputs and outputs that can be used by a perception module.

FIG. 5 shows an example of inputs 502*a-d* (e.g., sensors 121 shown in FIG. 1) and outputs 504*a-d* (e.g., sensor data) that is used by the perception module 402 (FIG. 4). One input 502*a* is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual navigation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504*a-d* are combined using a sensor fusion technique. Thus, either the individual outputs 504*a-d* are provided to other systems of the vehicle 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
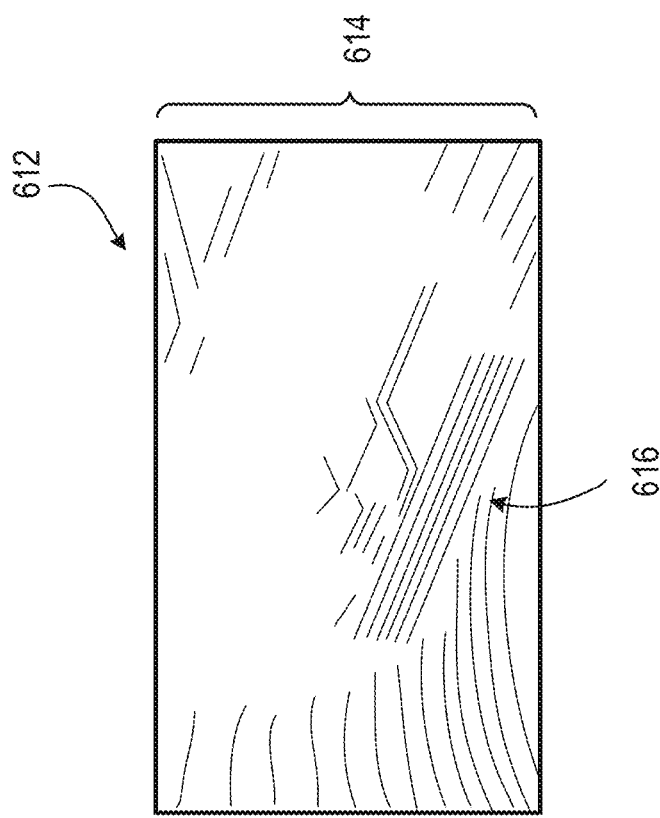
FIG. 6 shows an example of a LiDAR system.
Figure 6:
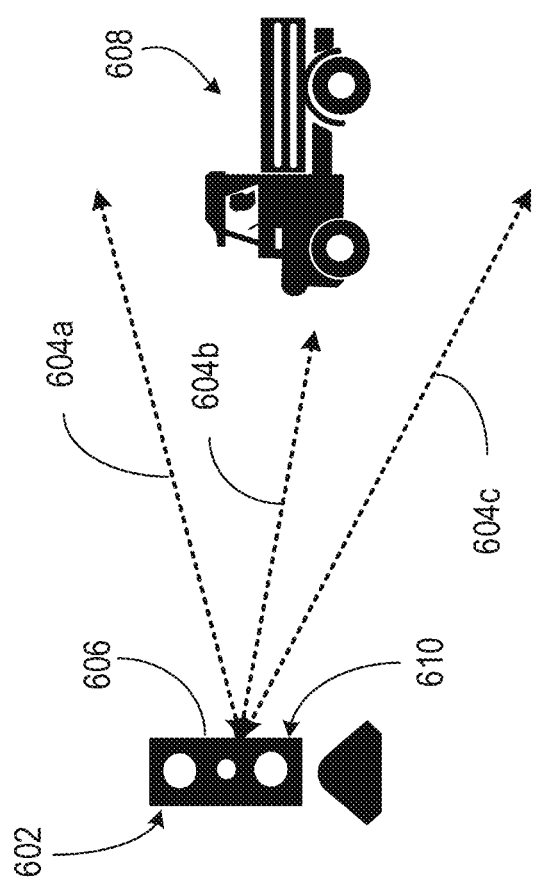

FIG. 6 shows an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
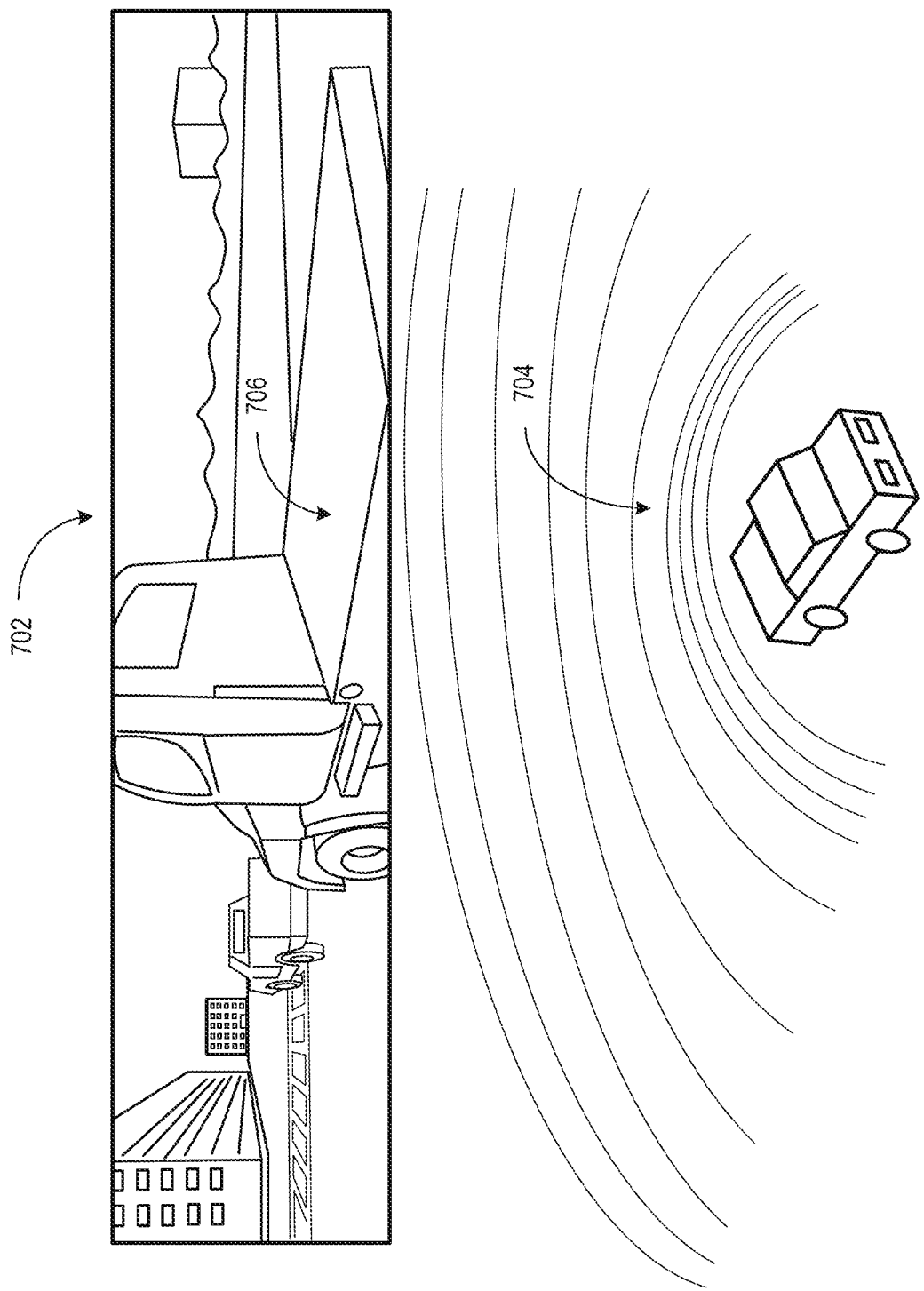
FIG. 7 shows the LiDAR system in operation.

FIG. 7 shows the LiDAR system 602 in operation. In the scenario shown in this figure, the vehicle 100 receives both camera system output 504*c* in the form of an image 702 and LiDAR system output 504*a* in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
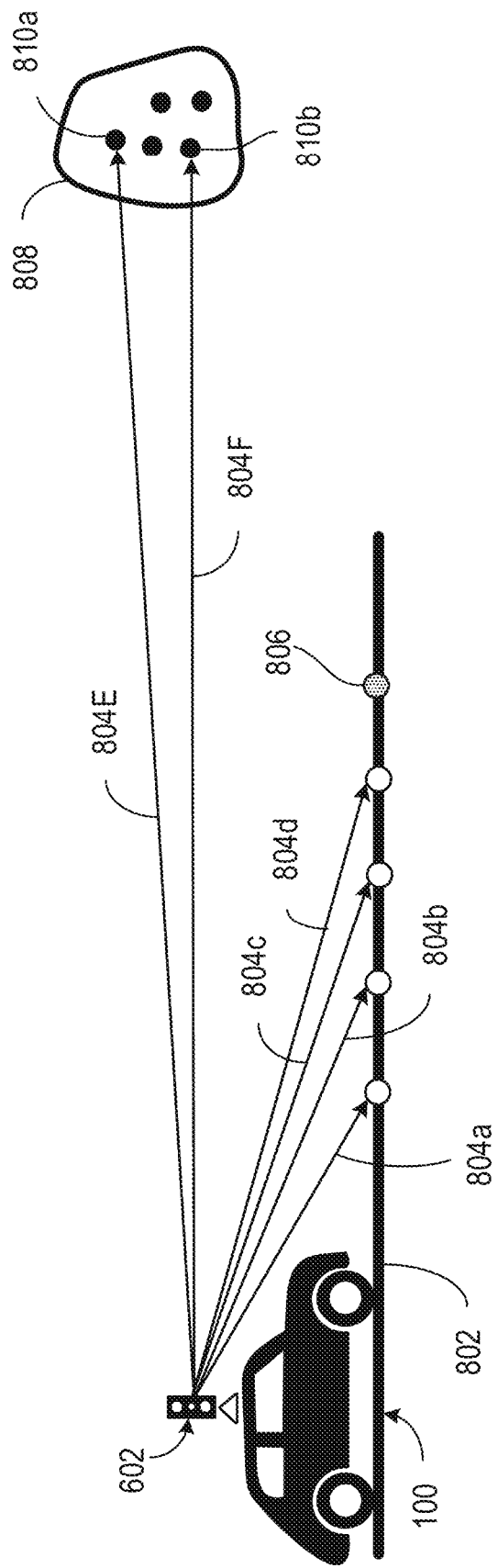
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the vehicle 100 can determine that the object 808 is present.

Autonomous Vehicle Planning

Figure 9:
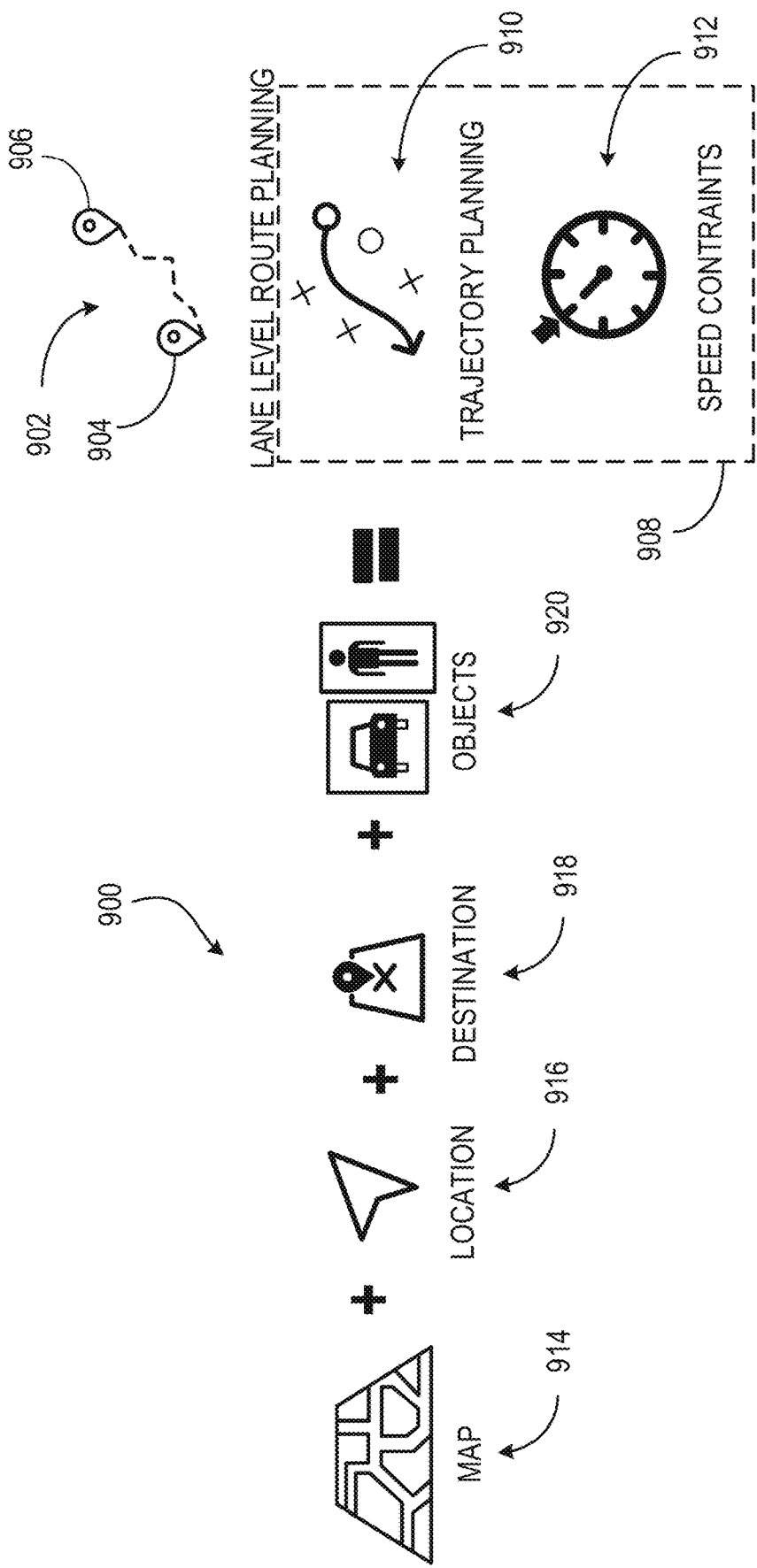
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
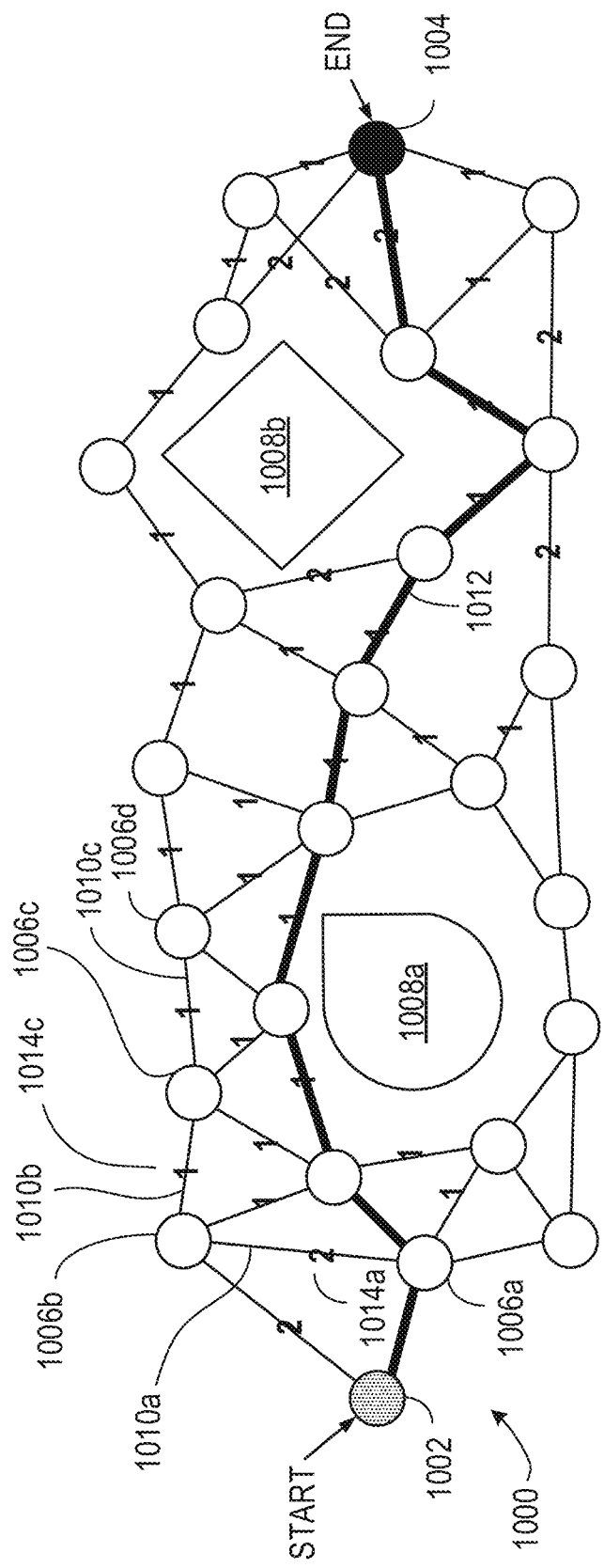
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by vehicle 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the vehicle 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the vehicle 100, e.g., other automobiles, pedestrians, or other entities with which the vehicle 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an vehicle 100 to travel between one node 1006a and the other node 1006b, e.g., without having to travel to an intermediate node before arriving at the other node 1006b. (When we refer to a vehicle 100 traveling between nodes, we mean that the vehicle 100 travels between the two physical positions represented by the respective nodes.) The edges 1010a-c are often bidirectional, in the sense that vehicle 100 travels from a first node to a second node, or from the second node to the first node. In an embodiment, edges 1010a-c are unidirectional, in the sense that an vehicle 100 can travel from a first node to a second node, however the vehicle 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the vehicle 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
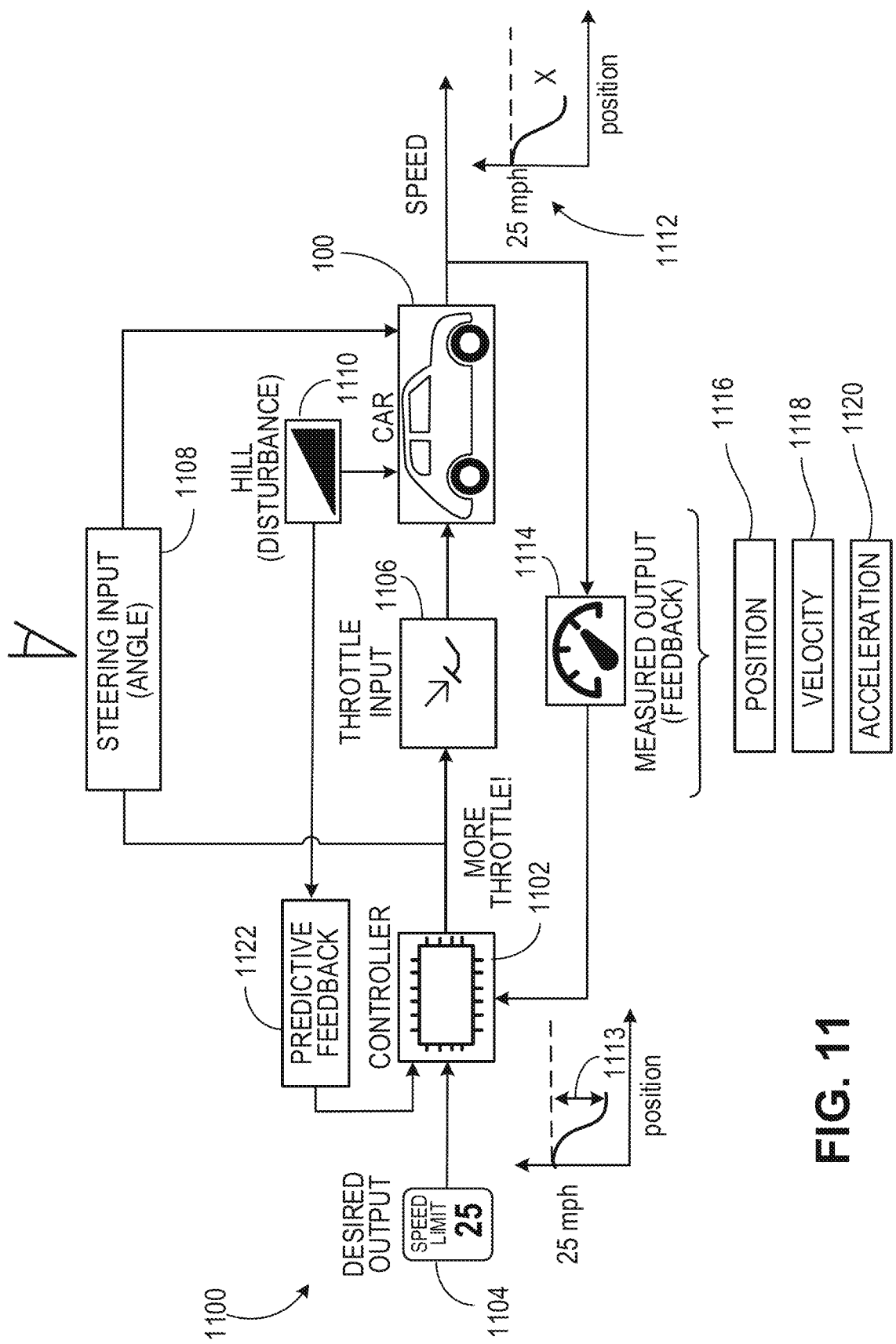
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of a vehicle 100, e.g., by engaging the steering pedal, or engaging another throttle control, to achieve the desired output 1104. In some examples, the throttle input 1106 also includes data usable to engage the brake (e.g., deceleration control) of the vehicle 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the vehicle 100 encounters a disturbance 1110, such as a hill, the measured speed 1112 of the vehicle 100 is lowered below the desired output speed. In an embodiment, any measured output 1114 is provided to the controller 1102 so that the necessary adjustments are performed, e.g., based on the differential 1113 between the measured speed and desired output. The measured output 1114 includes a measured position 1116, a measured velocity 1118 (including speed and heading), a measured acceleration 1120, and other outputs measurable by sensors of the vehicle 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the vehicle 100 detect ("see") a hill, this information can be used by the controller 1102 to prepare to engage the throttle at the appropriate time to avoid significant deceleration.

Figure 12:
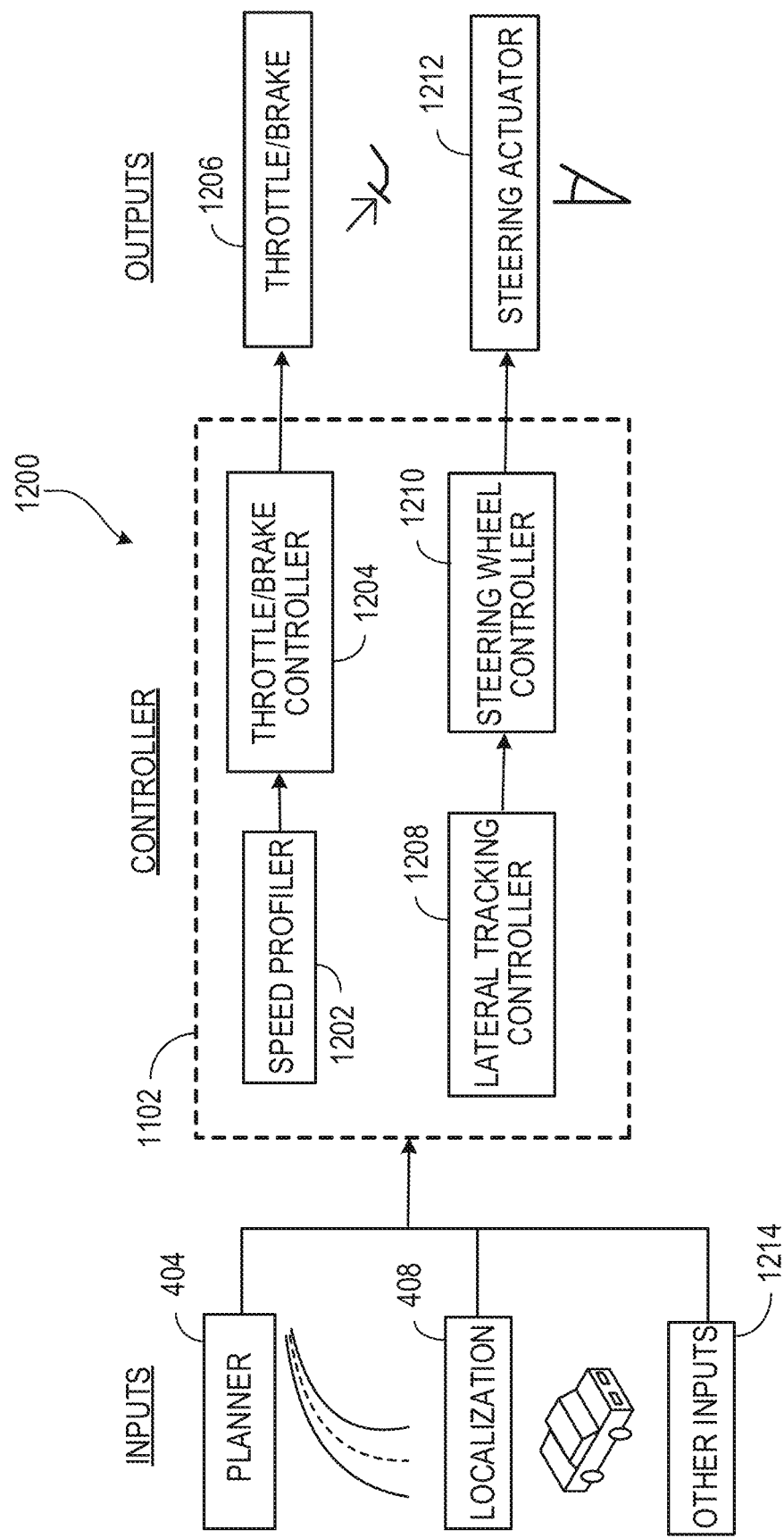
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the vehicle 100 begins operation and to determine which road segment to traverse when the vehicle 100 reaches an intersection. A localization module 408 provides information to the controller 1102 describing the current location of the vehicle 100, for example, so that the controller 1102 can determine if the vehicle 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Architecture for Implementing Occlusion Representations over Road Features

Figure 13:
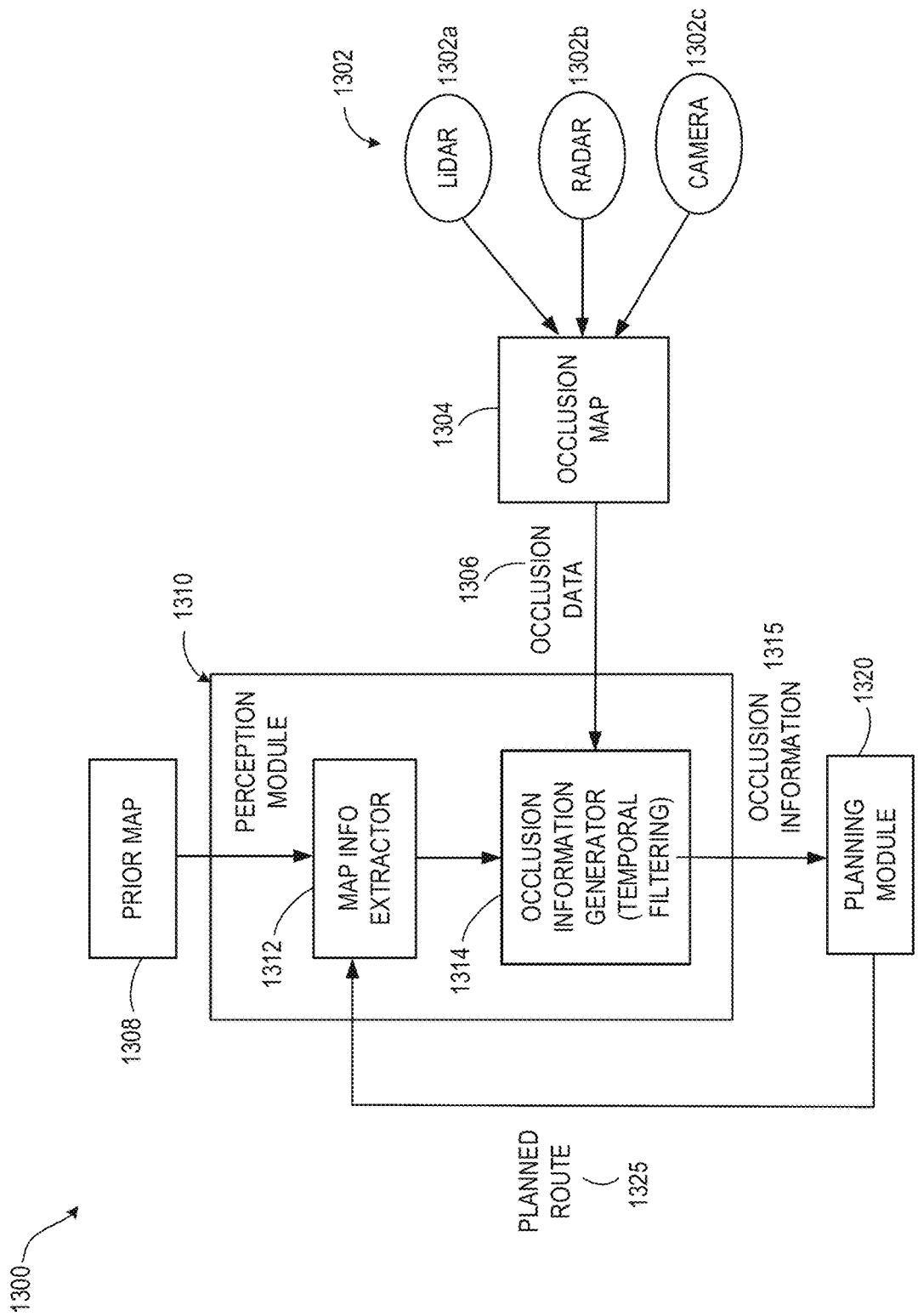
FIG. 13 illustrates a block diagram of an architecture 1300 for implementing occlusion representations over road features.

FIG. 13 illustrates a block diagram of an architecture 1300 for implementing occlusion representations over road features during an operation of a vehicle, in accordance with one or more embodiments. In an embodiment, the architecture 1300 is implemented in a vehicle system of the vehicle. In some examples, the vehicle is an embodiment of the AV 100 shown in FIG. 1. In some examples, the vehicle system is an embodiment of the AV system 120 shown in FIG. 1. The architecture 1300 provides an efficient way to represent surrounding occlusion information in an environment (e.g., the environment 190 shown in FIG. 1) for the vehicle, such that the vehicle system reasons over occlusion and uncertainty in the environment for safe decision making. For example, as illustrated with further details below, the architecture 1300 presents a lightweight computationally efficient occlusion interface resembling a coarse 1D visibility grid breakdown of incoming cross traffic lanes/lane connectors at an intersection encapsulated in precedence areas and/or independent reporting of visibility at stop areas for multi-way stop intersection precedence determination.

Referring to FIG. 13, the architecture 1300 includes a perception module 1310 (e.g., the perception module 402 shown in FIG. 4) and a planning module 1320 (e.g., the planning module 404 shown in FIG. 4). The perception module 1310 obtains area information of at least one area of interest for the vehicle from prior mapping data 1308 and identifies occlusion data 1306 associated with the at least one area of interest from an occlusion map 1304. The perception module 1310 then determines occlusion information 1315 associated with the at least one area of interest based on the area information and the occlusion data 1306. The occlusion information 1315 has a smaller data size than the occlusion data 1306. The perception module 1310 provides the occlusion information 1315 to the planning module 1320. The planning module 1320 plans a route 1325 for the vehicle based on the occlusion information 1315 and other data, e.g., from the localization module 408 and the database module 410 of FIG. 4. The vehicle is operated in accordance with the planned route 1325 by a control module, e.g., the control module 406 shown in FIG. 4. The planning module 1320 provides the planned route 1325 back to the perception module 1310 that updates areas of interest for the vehicle.

The architecture 1300 includes a sensor system 1302 (e.g., the sensors 121 shown in FIG. 1 or FIG. 4) for sensing or measuring properties of the vehicle's environment. In one embodiment, the sensor system 1302 includes a LiDAR system 1302a (e.g., the LiDAR system 502a shown in FIG. 5), a RADAR system 1302b (e.g. the RADAR system 502b shown in FIG. 5), and a camera system 1302c (e.g., the camera system 502c shown in FIG. 5). The sensor system 1302 (e.g., at least one sensor of sensor system 1302) identifies nearby physical objects, e.g., objects associated with (e.g., represented by) data generated by at least one sensor of sensor system 1302). In some examples, the objects include seen objects that are in a sight range, e.g., perceived by the camera system 1302c or the LiDAR system 1302a. In some examples, the objects include unseen objects that are out of the sight range, e.g., perceived by the RADAR system 1302b. In some examples, the objects are classified into types such as pedestrian, bicycle, automobile, traffic sign, e.g., the classified objects 416 shown in FIG. 4. Outputs (e.g., the outputs 504a, 504b, 504c shown in FIG. 5) of the sensor system 1302 are combined using a sensor fusion technique by the vehicle into the occlusion map 1304 for the environment of the vehicle. In some examples, the occlusion map 1304 is represented with 2D or 3D points, lines, or shapes, together with scene descriptions.

In one embodiment, the vehicle system maintains the occlusion map 1304 by accessing a database including road network information, or using the outputs from the sensor system 1302, or both. The occlusion map 1304 includes known (seen or unseen) objects that are perceived by the sensor system 1302 of the vehicle or are otherwise known.

In one embodiment, the occlusion map 1304 includes hypothetical (or unknown) objects that cannot be perceived by the sensor system 1302. In some examples, the vehicle system generates the hypothetical objects by hypothesizing the presence or attributes of possible unknown objects in the unperceived environment based on a variety of factors and approaches. A hypothetical object includes a moving object, or an object that uses a path of travel from which the vehicle is excluded, or both. For example, the hypothetical object includes at least one of the following: a second vehicle, a bicycle, a bus, a train, a pedestrian, and an animal.

In an example, the occlusion map 1304 includes at least one occluded object. In one embodiment, the occluded object in the occlusion map 1304 is an unseen but known object that is perceived by the sensor system 1302. In one embodiment, the occluded object is a hypothetical object. The vehicle system stores occlusion data of the occluded object in the occlusion map 1304. In some examples, the occlusion data includes a representative element for the occluded object and an attribute of the occluded object. The representative element is determined based on a type of the occluded object. The attribute includes a size or a motion state or both. The motion state is a stationary condition, or a moving condition, or a speed, or a moving direction, or a combination of two or more of them. For example, a vehicle, as an occluded object, is in the stationary condition when the vehicle is not started and parked on a road, and the vehicle is in the moving condition when the vehicle is started and moving on the road with the speed along the moving direction. The speed is set to less than or equal to a predetermined maximum value. The predetermined maximum value includes a speed limit. In some cases, the predetermined maximum value includes a quantity derived from other objects concurrently or previously observed in the environment. The predetermined maximum value is a quantity derived from historical data, road configuration, traffic rules, an event, a time, a weather condition, or a combination of two or more of them.

The perception module 1310 includes a map information extractor 1312 for obtaining the area information of the at least one area of interest for the vehicle, e.g., from the prior mapping data 1308 in a mapping database. In one embodiment, the mapping database is implemented in the database module 410 shown in FIG. 4. The prior mapping data 1308 includes road network information, e.g., high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

In one embodiment, the perception module 1310 determines the at least one area of interest for the vehicle to be at least one stop area associated with a stop line (or a stop sign) on a current route for the vehicle. In some examples, the stop area is occluded, e.g., when the stop is at a multi-way stop intersection. The stop area is represented by a shape, e.g., a rectangle, in the mapping data 1308. In some examples, the length of the stop area is 2 to 3 meters. The map information extractor 1312 extracts the area information of the stop area from the mapping data 1308. In some examples, the area information of the stop area includes an identifier (ID) of the stop area in the mapping data 1308. In one embodiment, the area of interest includes at least one crosswalk, the vehicle's lane area immediately behind a steep hill, or lane area adjacent to the vehicle's lane of travel.

In one embodiment, the perception module 1310 determines the at least one area of interest for the vehicle to be at least one precedence area (e.g., encapsulation of incoming lane area) associated with an intersection along the current route for the vehicle. For example, the precedence area or an extension of the precedence area along a direction of a corresponding lane overlaps with a lane along the vehicle's current route or any potential route for the vehicle in the intersection. In some examples, the precedence area is occluded or contains unseen agents which would have precedence over the vehicle as it attempts to execute an unprotected turn through the intersection. In some examples, the precedence area is represented by a shape, e.g., a rectangle, in the mapping data 1308. In some examples, a length of the precedence area is over a predetermined distance, e.g., 10 meters, 20 meters, 30 meters, 40 meters, 50 meters, or 60 meters, that is dependent on the clearance requirement for road rule compliance. The map information extractor 1312 extracts the area information of the precedence area from the mapping data 1308. In some examples, the area information of the precedence area includes at least one of an area identifier of the precedence area, an identifier of the corresponding lane, or an identifier of the intersection in the mapping data 1308.

Figure 14A:
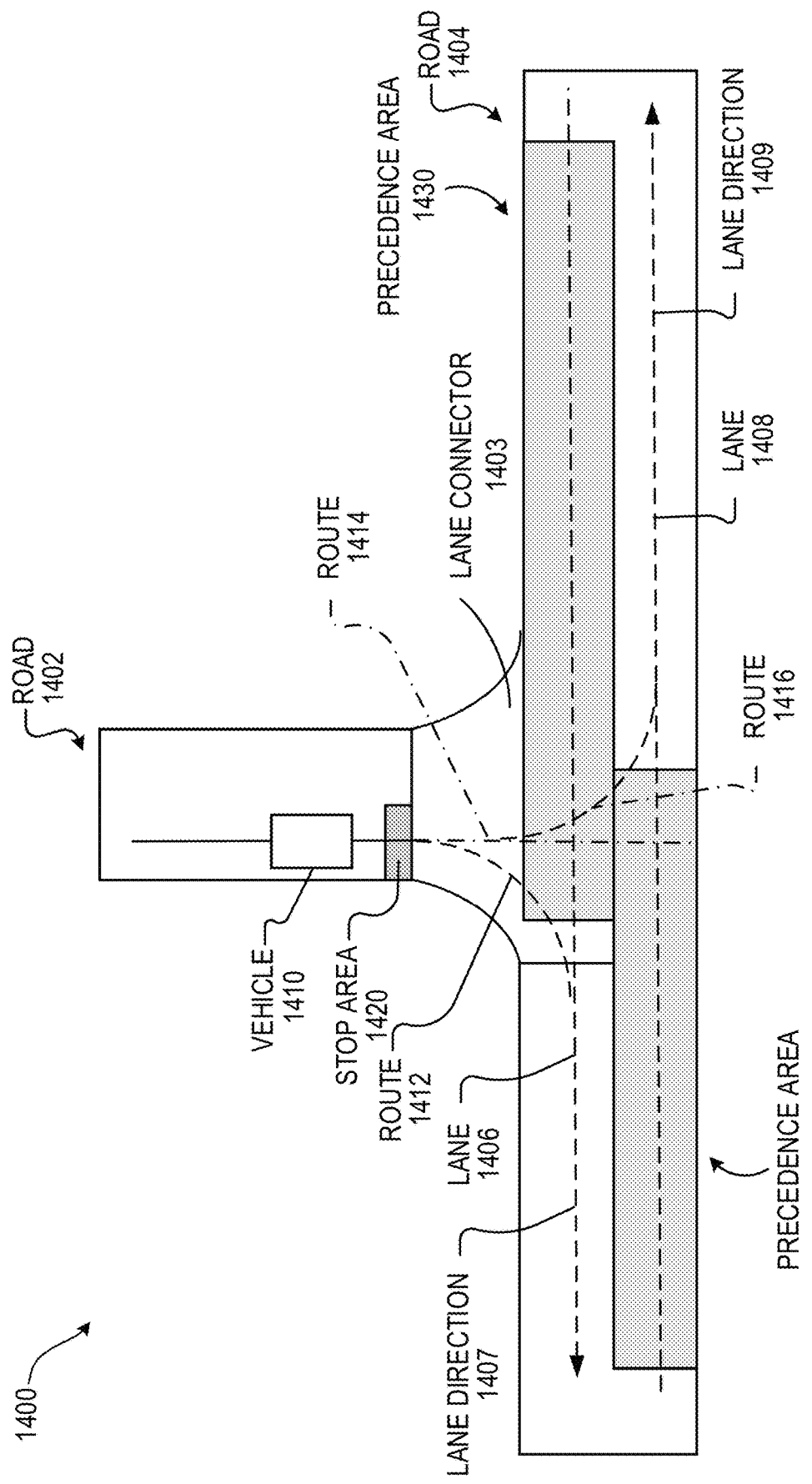
FIGS. 14A-14C illustrate an example of generating area information for implementing occlusion representations over road features.
Figure 14B:
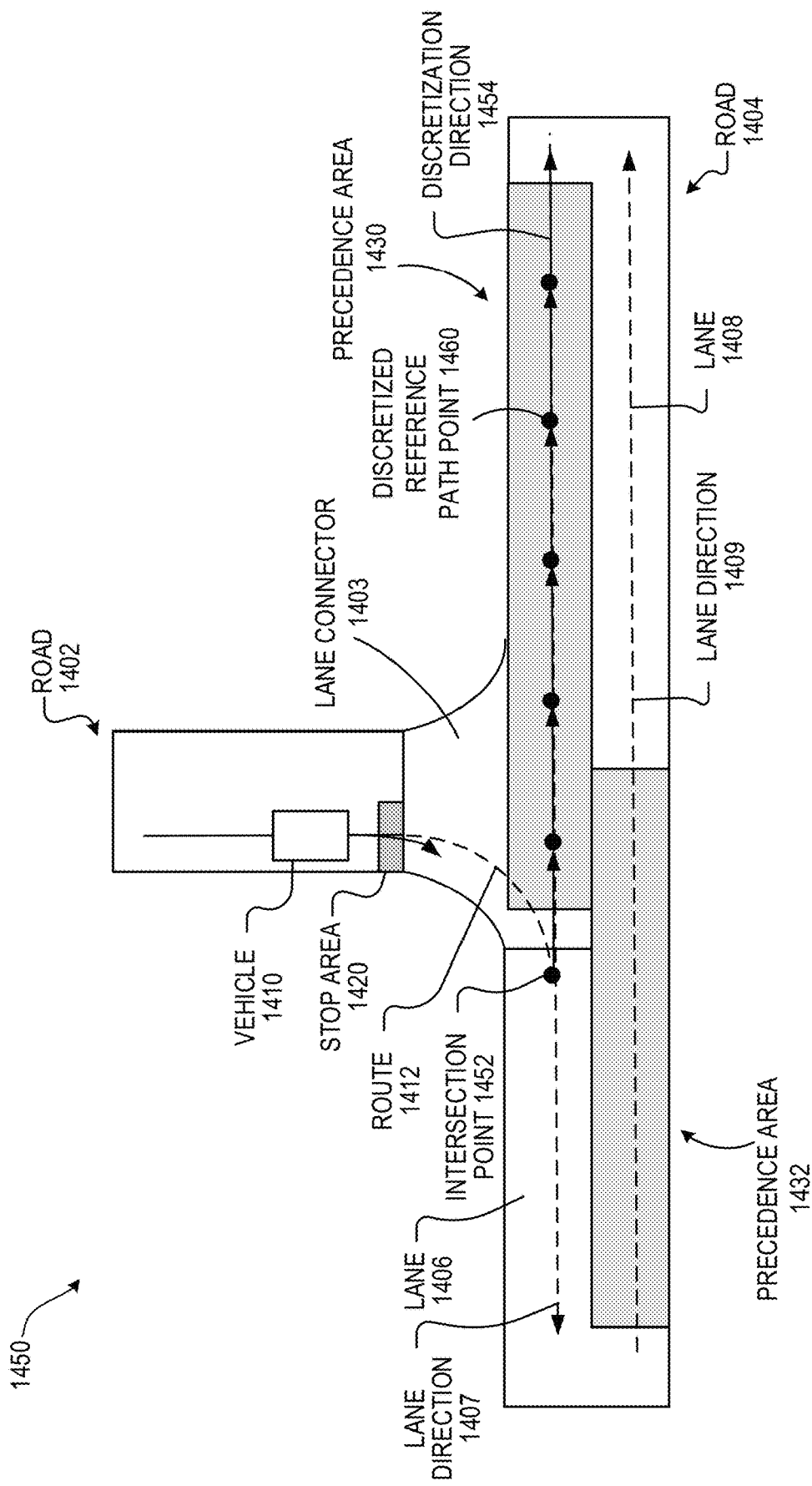

In one embodiment, as illustrated with further details in FIG. 14B, the precedence area is represented by sequentially discretized reference path points along at least one lane direction of the corresponding lane within the precedence area. In some examples, the discretized reference path points are evenly separated with a predetermined distance along the lane direction. In one embodiment, as illustrated with further details in FIG. 14C, the precedence area is represented by a plurality of lane segments sequentially sorted along the at least one lane direction (e.g., from a front of the precedence area to a rear of the precedence area along the lane direction). Each lane segment includes at least one discretized reference path point. Each lane segment has a respective identifier. Each lane segment is represented by a shape, e.g., a polygon. In one embodiment, the precedence area corresponds to multiple lanes along the same lane direction. Each of the multiple lanes is partitioned into a respective plurality of lane segments each having respective identifiers. In one embodiment, a graph structure or tree structure is used to store each lane or each lane connector or both inside the precedence area.

In one embodiment, area information of a precedence area includes discretized reference path points, or partitioned segments, or both. The area information also includes information for the discretized reference path points and the partitioned lane segments, e.g., a length of each lane segment or a distance between adjacent reference path points. In one embodiment, the area information is included in the prior mapping data 1308, e.g., by adding a discretized layer including segmented lanes or discretized reference path points in the precedence area in the mapping database. The perception module 1310 obtains the area information directly from the prior mapping data 1308. In one embodiment, the perception module 1310 generates the area information of the precedence area based on mapping data of the precedence area from the prior mapping data 1308, e.g., at a beginning of a process of implementing the occlusion representations.

In one embodiment, the perception module 1310 generates the area information of the precedence area by a brute force algorithm to analyze all lane points within the precedence area. In one embodiment, as illustrated with further details in FIGS. 14A-14C, the perception module 1310 generates the area information of the precedence area by first determining an intersection point between the current route of the vehicle and the precedence area or an extension of the precedence area along the lane direction and determining, from the intersection point, a series of discretized reference path points or partitioned lane segments or both along a direction opposite to the lane direction within the precedence area.

The map information extractor 1312 also receives the planned route 1325 of the vehicle from the planning module 1320. The perception module 1310 updates the at least one area of interest for the vehicle based on the planned route 1325. In one embodiment, the perception module 1310 periodically queries a plurality of areas of interest within a predetermined distance from the vehicle, and periodically provides occlusion information associated with the plurality of areas of interest to the planning module 1320 based on periodically querying the plurality of areas of interest nearby the vehicle. In one embodiment, the perception module 1310 filters out a first plurality of areas of interest from the plurality of areas of interest. A path extending from each of the first plurality of areas of interest along a corresponding lane direction interacts paths that are different from a current route of the vehicle. That is, each of the first plurality of areas of interest is in a direction that is away from the current route. The perception module 1310 publishes occlusion information associated with a second plurality of areas of interest to the planning module 1320. The second plurality of areas of interest are areas of interest included in the plurality of areas of interest and different from the first plurality of areas of interest.

The perception module 1310 includes an occlusion information generator 1314 configured for generating occlusion information. After determining the at least one area of interest (e.g., at least one precedence area or at least one stop area or both) for the vehicle, the perception module 1310 (e.g., the occlusion information generator 1314) identifies the occlusion data 1306 associated with the at least one area of interest from the occlusion map 1304. In one embodiment, the perception module 1310 first identifies the at least one area of interest in the occlusion map 1304 and then determines the occlusion data 1306 associated with the at least one area of interest in the occlusion map 1304. The occlusion data 1306 includes occlusion data of at least one occluded object (e.g., an unseen object) in the at least one area of interest. The occlusion data of the at least one occluded object includes an attribute of the occluded object. The representative element is associated with a type of the occluded object. The attribute includes a size or a motion state or both. In one embodiment, the attribute includes a velocity attribute (e.g., an estimated speed range) and a direction attribute (e.g., a motion direction). In one embodiment, the perception module 1310 queries a representative element associated with the at least one area of interest in the occlusion map 1304. In some examples, the representative element is a polygon or a center point of a queried area (e.g., a partitioned segment in the at least one area of interest). Then, the perception module 1310 obtains the occlusion data 1306 associated with the representative element from the occlusion map 1304. In some examples, the occlusion data 1306 is represented by 2D or 3D data.

The perception module 1310 (e.g., the occlusion information generator 1314) determines the occlusion information 1315 associated with the at least one area of interest based on the area information associated with the at least one area of interest and the occlusion data 1306 associated with the at least one area of interest. In one embodiment, the perception module 1310 determines the occlusion information 1315 based on the partitioned lane segments (e.g., represented by polygons) within the at least one area of interest by determining a respective level of occlusion (or non-occlusion) for each of the lane segments. A level of occlusion (or non-occlusion) represents a confidence level of occlusion (or non-occlusion). In some examples, the level of occlusion (or non-occlusion) is a value between 0 and 1, where 1 represents a confidence of 100%. In one example, the level of occlusion represents a boolean decision, either 0 or 1. The occlusion information 1315 is represented by 1D data including a series of shapes (e.g., points or polygons) with respective levels of occlusion (e.g., values between 0 and 1). The occlusion information 1315 has a smaller data size than the occlusion data 1306.

In one embodiment, the perception module 1310 determines a corresponding level of occlusion for each occluded object in the at least one area of interest. The occluded object is represented by a representative element (e.g., a polygon). The occlusion information 1315 includes the representative element of the occluded object and the corresponding level of occlusion.

In one embodiment, the perception module 1310 identifies occupancy data associated with the at least one area of interest in the occlusion map 1304. The occupancy data includes occlusion data and non-occlusion data. The occupancy data represents whether an area is occupied by at least one object, e.g., an occluded object or a non-occluded object or both. The perception module 1310 determines a respective level of occupancy (or non-occupancy) for each partitioned segment (e.g., a lane segment) associated with the at least one area of interest. A level of occupancy (or non-occupancy) represents a confidence level of occupancy (or non-occupancy). In some examples, the level of occupancy (or non-occupancy) is a value between 0 and 1, where 1 represents a confidence of 100%. The perception module 1310 provides occupancy information including the respective levels of occupancy for partitioned segments associated with the at least one area of interest to the planning module 1320 for planning a route. The occupancy information is represented by 1D data including a series of shapes (e.g., points or polygons) with respective levels of occupancy (e.g., values between 0 and 1). The occupancy information has a smaller data size than the occupancy data.

In operation of the vehicle, the perception module 1310 recursively (periodically at a predetermined frequency or in real time) queries a plurality of areas of interest within a predetermined distance from the vehicle or along a route (a current route or a potential route) of the vehicle or both, and identifies occlusion data associated with the areas of interest from occlusion map 1304. The occlusion information generator 1314 obtains the occlusion data from the occlusion map 1304 and area information from the areas of interest from the map information extractor 1312 and generates occlusion information for the areas of interest based on the occlusion data and the area information. In one embodiment, the occlusion information generator 1314 updates the occlusion data obtained from the occlusion map 1304 and associated with at least one area of interest of the vehicle, and generates updated occlusion information associated with the at least one area of interest based on the updated occlusion data.

In one embodiment, the perception module 1310 (or the occlusion information generator 1314) applies a temporal filtering (or smoothing) algorithm to update occlusion information of an area of interest for the vehicle based on occlusion data associated with the area of interest. As the occlusion data (e.g., occluded objects) associated with the area of interest are recursively generated through a time course, the temporal filtering or smoothing algorithm uses temporal relationships of the occlusion data generated at different time steps to make the occlusion data continuously vary, which mitigates issues including flickering of the occlusion data due to noise in sensor measurements or missing or delayed sensor measurements. For example, the occlusion information generator 1314 updates the occlusion information based on a velocity attribute (e.g., an estimated speed range) and a direction attribute (e.g., a motion direction) of at least one occluded object in the area of interest. The occlusion information generator 1314 updates at least one corresponding level of occlusion of at least one partitioned segment in the area of interest according to a motion of the at least one occluded object. The motion is along the direction attribute of the at least one occluded object and based on the velocity attribute of the at least one occluded object. In one embodiment, the perception module 1310 also applies temporal filtering to update occupancy information of an area of interest for the vehicle based on occupancy data associated with the area of interest.

In one embodiment, the perception module 1310 represents the at least one area of interest of the vehicle and corresponding occlusion information in a structure (e.g., a graphic structure, a hierarchical structure, or a tree structure). Each area of interest has a respective identifier. Each lane is a node in the structure and maintains its corresponding connectivity. Discretization (or partition) information and occlusion information are saved in each node or in another map. A traversal action is needed to get proper information out of the structure.

The perception module 1310 provides an identifier of the at least one area of interest and the corresponding occlusion information 1315 associated with the at least one area of interest to the planning module 1320. In one embodiment, the perception module 1310 provides data associated with a graphic structure (or interface) based on lane segments associated with the at least one area of interest and the respective levels of occlusion. The graphic structure (or interface) is a map associating identifiers of areas of interest with corresponding occlusion information. The planning module 1320 displays the graphic structure (or interface) on a display of the vehicle.

In one embodiment, the data associated with the graphic structure (or interface) has a structure as below:

```
Struct OcclusionInfo
{
    uint32 timestamp;
    std::vector<PrecedenceAreaOcclusionInfo>PAOcclusionInfo;
    //Occlusion information for precedence area.
    std::vector<StopAreasOcclusionInfo>SAOcclusionInfo;
    //Occlusion information for stop area.
};
Struct StopAreasOcclusionInfo
{
    ID areaID; // an identifier (ID) of the stop area
    double confidenceLevel; // a value between 0 to 1
    that describes a confidence level
    of non-occlusion. 1 means highly confident.
};
Struct PrecedenceAreaOcclusionInfo
{
    ID areaID; // ID of Precedence Area
    std::unordered_map<ID, LaneOcclusionNode>
    PrecedenceAreaOcclusionInfo;
    // A mapping from laneID to LaneOcclusionNode.
    laneID represents a lane/lane
    connector associated with the precedence area
};
Struct LaneOcclusionNode
{
    double segDist; // A distance used to segment the lane.
    ID laneID; // ID of a current lane;
    vector<DiscretizedOcclusionInfo> occlusionInfo;
    // occlusion information for each
    of segments sorted in the order of lane direction.
};
Struct DiscretizedOcclusionInfo
{
    Point2D pt; // a center of a queried lane segment.
    Polygon poly; // The lane segment is represented by a polygon
```

-continued

```
    double confidenceLevel; // a value between 0 to 1
    that describes a confidence level
    of non-occlusion for the lane segment. 1 means highly confident.
}.
```

Processes for Implementing Occlusion Representations over Road Features

Figure 14C:
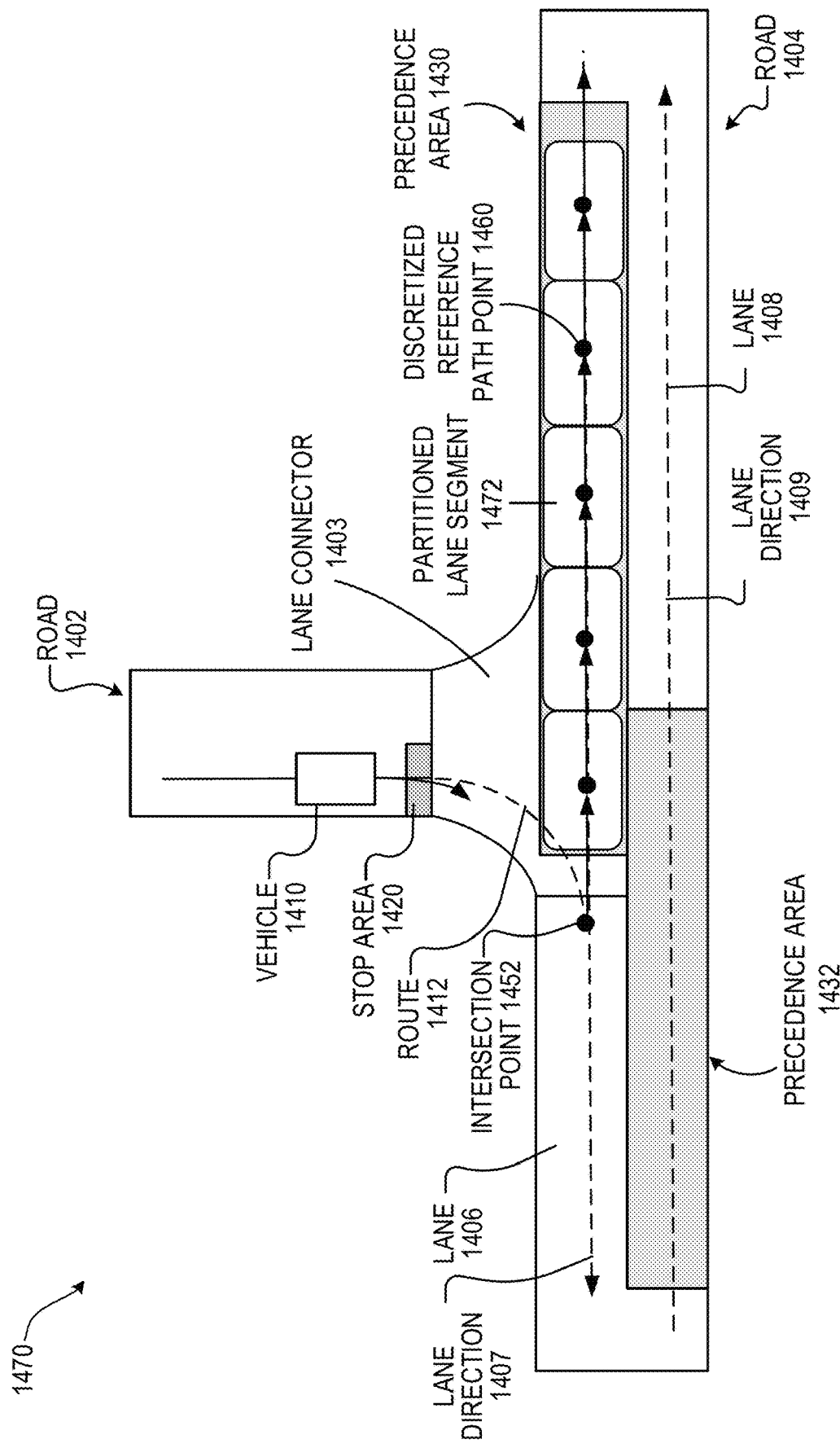

FIGS. 14A-14C illustrate an example of generating area information for implementing occlusion representations over road features. The generation is performed offline, e.g., the database module 410 of FIG. 4, or online, e.g., the perception module 1310 of FIG. 13.

FIG. 14A illustrates an environment 1400 where a vehicle 1410 (e.g., the AV 100 of FIG. 1) travels in a road 1402. The road 1402 intersects with another road 1404. The road 1402 includes at least one lane. The road 1404 includes at least one lane, e.g., lane 1406 and lane 1408. Each lane has a lane direction. Lane 1406 has a lane direction 1407 and lane 1408 has a lane direction 1409 opposite to the lane direction 1407. The lane of the road 1402 is connected with the lane 1406 of the road 1404 with a lane connector 1403. Information of the roads 1402, 1404, the lanes 1406, 1408, and the lane connector 1403 are stored in a road network database, e.g., implemented in the database module 410 of FIG. 4. In one embodiment, the information includes a respective identifier for each road, each lane, and each lane connector.

The vehicle 1410 travels along a route. In one example, the route is a route 1412 along which the vehicle 1410 makes a right turn from the road 1402 to lane 1406 of the road 1404. In one example, the route is a route 1414 along which the vehicle 1410 travels directly through an intersection between the road 1402 and the 1404. In one an example, the route is a route 1416 along which the vehicle 1410 makes a left turn from the road 1402 to lane 1408 of the road 1404.

When the vehicle 1410 travels along the route, a perception module, e.g., the perception module 1310 of FIG. 13, of the vehicle 1410 determines at least one area of interest for the vehicle 1410 based on at least one of the route, a potential route, or a predetermined distance from the vehicle 1410. In some examples, the perception module determines the at least one area of interest periodically with a predetermined time period or at a predetermined frequency.

As illustrated in FIG. 14A, the at least area of interest for the vehicle 1410 includes a stop area 1420 and precedence areas 1430, 1432. The stop area 1420 is behind a stop line on the route. The stop area 1420 is represented by a rectangle shape. The precedence area 1430 is on the lane 1406 and is represented by a rectangle shape. An extension of the precedence area 1430 intersects with the route 1412. The precedence area 1432 is on the lane 1408 and is also represented by a rectangle shape. An extension of the precedence area 1432 intersects with the route 1414. In one embodiment, the perception module determines characteristics (e.g., a location, a size, or an area) of the stop area 1420 and the precedence areas 1430, 1432. In one embodiment, a database module, e.g., the database module 410 of FIG. 4, determines the characteristics of the stop area 1420 and the precedence areas 1430, 1432, e.g., based on road network information in a road network database implemented in the database module. The database module stores the characteristics of the stop area 1420 and the precedence areas 1430, 1432 in the road network database. The road network database also stores respective identifiers for the stop area 1420 and the precedence areas 1430, 1432. The perception module identifies the at least one area of interest and obtains information of the at least one area of interest from the road network database.

FIG. 14B illustrates an environment 1450 where the precedence area 1430 for the vehicle 1410 along the route 1412 is discretized. An intersection point 1452 is first determined by extending the precedence area 1430 along the lane direction 1407 of the lane 1406 corresponding to the precedence area 1430. Then, a series of discretized reference path points 1460 are determined from a first end of the precedence area 1430 to a second end of the precedence area 1430 along a discretization direction 1454 opposite to the lane direction 1407. In one example, the discretized reference path points 1460 are evenly distributed with a predetermined distance along the discretization direction 1454. In one example, the discretized reference path points are not evenly distributed along the discretization direction 1454, and adjacent reference path points closer to the lane connector 1430 have a smaller distance than adjacent reference path points further from the lane connector 1430 in the precedence area.

FIG. 14C illustrates an environment 1470 where the precedence area 1430 for the vehicle 1410 along the route 1412 is partitioned into a series of partitioned segments 1472. The partitioned segments 1472 are lane segments on the lane 1406. In one embodiment, each partitioned segment 1472 includes a discretized reference path point 1460 that is a center point of the partitioned segment 1472. Each partitioned segment 1472 is represented by a polygon. Area information of the precedence area 1430 includes discretized reference path points 1460 and partitioned segments 1472. In one embodiment, the area information also includes information for the discretized reference path points 1460 and the partitioned segments 1472, e.g., a length of each partitioned segment or a distance between adjacent discretized reference path points 1460.

Figure 15:
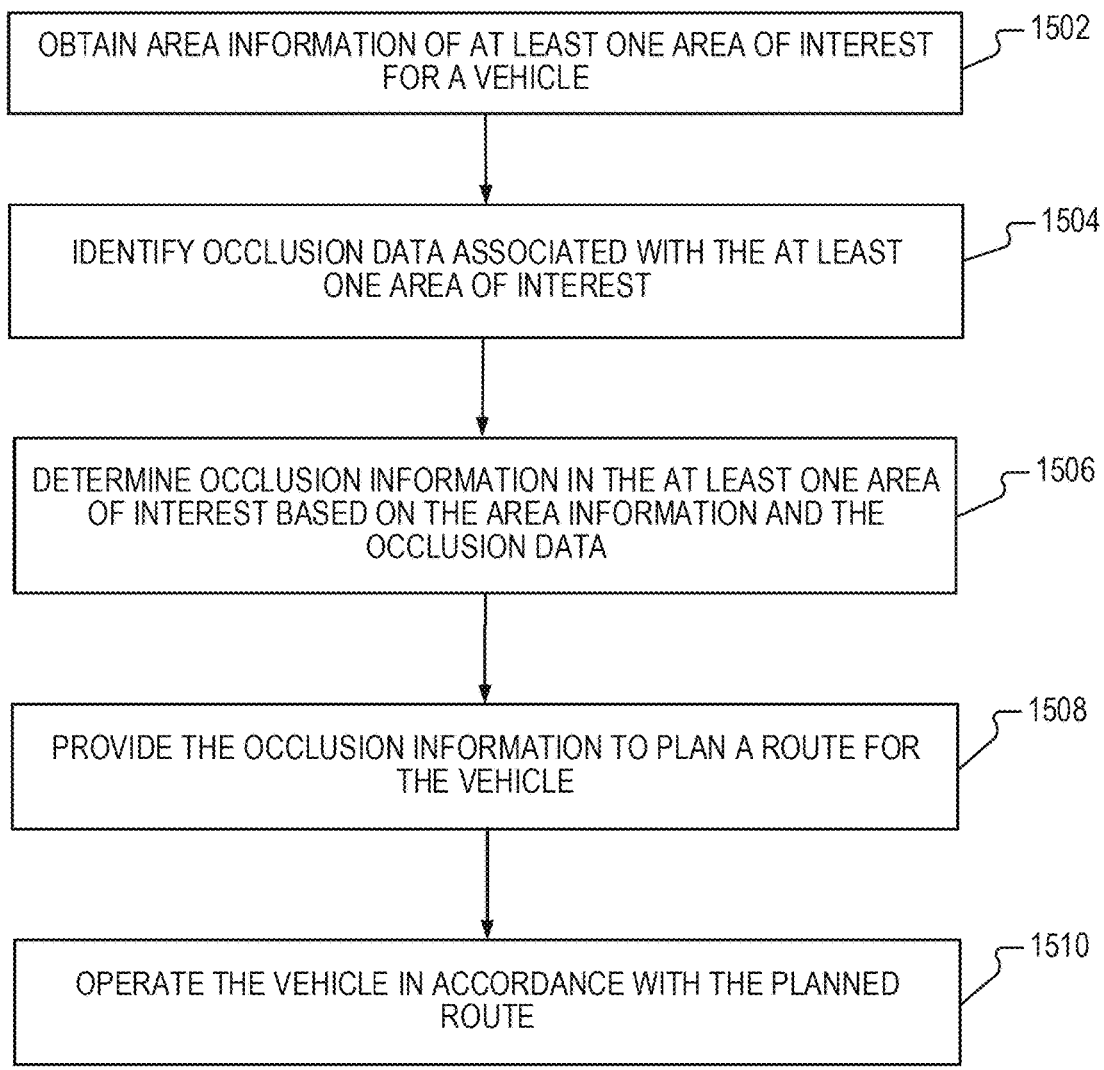
FIG. 15 illustrates a process for implementing occlusion representations over road features.

FIG. 15 illustrates a process 1500 for implementing occlusion representations over road features during an operation of a vehicle, e.g., the AV 100 shown in FIG. 1, in accordance with one or more embodiments. The process 1500 is performed by a vehicle system, e.g., the AV system 120 shown in FIG. 1. The vehicle system includes a perception module (e.g., the perception module 1310 shown in FIG. 13), a planning module (e.g., the planning module 1320 shown in FIG. 13), and a control module (e.g., the control module 406 shown in FIG. 4). Likewise, embodiments may include different and/or additional steps, or perform the steps in different orders.

The perception module obtains 1502 area information of at least one area of interest for the vehicle. The perception module determines the at least one area of interest based on a current route of the vehicle (e.g., the route 1412 shown in FIG. 14A), a potential route of the vehicle (e.g., the route 1414 shown in FIG. 14A), or within a predetermined distance from the vehicle. The at least one area of interest includes at least one stop area (e.g., the stop area 1420 shown in FIG. 14A), or at least one precedence area (the precedence area 1430 or 1432 shown in FIG. 14A), or both.

The area information includes discretized reference path points (e.g., the reference path points 1460 shown in FIG. 14B) or partitioned segments (e.g., the partitioned lane segments 1472 of FIG. 14C), or both. In one embodiment, the perception module obtains the area information of the at least one area of interest by obtaining discretized reference path points along at least one lane direction corresponding to the at least one area of interest. In one embodiment, the perception module obtains the area information of the at least one area of interest by obtaining a plurality of lane segments sequentially sorted along the at least one lane direction, each lane segment including at least one discretized reference path point.

In one embodiment, the perception module obtains the area information of the at least one area of interest from a mapping database, e.g., a road network database implemented in a database module such as the database module 410 shown in FIG. 4. The area information also includes an identifier of each lane (e.g., the lane 1406 shown in FIG. 14A) or lane connector (e.g., the lane connector 1403 shown in FIG. 14A) corresponding to the at least one area of interest.

In one embodiment, the perception module obtains the area information of the at least one area of interest by generating the area information of the at least one area of interest based on mapping data from the mapping database. As illustrated in FIG. 14B, the perception module determines an intersection point between the current route (e.g., the route 1412) of the vehicle and an area of interest (e.g., the precedence area 1430) or an extension of the area of interest of the at least one area of interest along a lane direction (e.g., the lane direction 1407), and determines, from the intersection point, a series of discretized reference path points along a direction (e.g., the discretization direction 1454) opposite to the lane direction within the area of interest. As illustrated in FIG. 14C, the perception module determines a plurality of lane segments (e.g., the lane segments 1472) sequentially sorted along the at least one lane direction, each lane segment including at least one discretized reference path point.

The perception module identifies 1504 occlusion data associated with the at least one area of interest in an occlusion map, e.g., the occlusion map 1304 shown in FIG. 13. In some examples, the occlusion map is represented with 2D or 3D points, lines, or shapes, together with scene descriptions. The AV system maintains the occlusion map by accessing a database including road network information (e.g., the road network database), or using outputs from a sensor system 1302 (e.g., the sensor system 1302 shown in FIG. 13), or both. In an example, the occlusion map includes at least one occluded object, e.g., a hypothetical object or an unseen but known object. The AV system stores occlusion data of the occluded object in the occlusion map. In one embodiment, the occlusion data includes a representative element for the occluded object and an attribute of the occluded object. In some examples, the representative element is determined based on a type of the occluded object. The attribute includes a size or a motion state or both. The occlusion data includes 2D or 3D data.

In one embodiment, the perception module identifies the occlusion data associated with the at least one area of interest by querying a representative element within the at least one area of interest and obtaining the occlusion data based on the representative element. In one embodiment, the representative element corresponds to an occluded object in the at least one area of interest. In one embodiment, the representative element corresponds to a discretized reference path point (e.g., the reference path point 1460 shown in FIG. 14B) or a partitioned segment (e.g., the lane segment 1472 shown in FIG. 14C) in the at least one area of interest.

The perception module determines 1506 occlusion information associated with the at least one area of interest based on the area information of the at least one area of interest and the occlusion data associated with the at least one area of interest. The occlusion data includes data associated with the occlusion information. The occlusion information has a smaller data size than the occlusion data.

In one embodiment, the perception module determines the occlusion information associated with the at least one area of interest by determining the occlusion information associated with the at least one area of interest based on the discretized reference path points. In one embodiment, the perception module determines the occlusion information by determining a respective level of occlusion for each partitioned segment based on the occlusion data associated with the at least one area of interest. In one embodiment, the perception module determines the occlusion information by determining at least one level of occlusion for at least one representative shape corresponding to at least one occluded object within the at least one area of interest.

In one embodiment, the perception module applies a temporal filtering algorithm to the occlusion data to update the occlusion information in the at least one area of interest. In one embodiment, the perception module applies the temporal filtering algorithm to update the occlusion information based on a velocity attribute and a direction attribute of at least one occluded object in the at least one area of interest. In one embodiment, the perception module updates at least one respective level of occlusion of at least one partitioned segment of the plurality of partitioned segments according to a motion of the at least one occluded object in the at least one area of interest, the motion being based on the velocity attribute of the at least one occluded object.

The perception module provides 1508 the occlusion information to the planning module for planning a route for the vehicle. In one embodiment, the perception module provides a respective unique identifier for each area of interest among a plurality of area, together with occlusion information corresponding to each area of interest, to the planning module. In one embodiment, the perception module provides data associated with a graphic interface based on a plurality of lane segments associated with the at least one area of interest and the respective levels of occlusion. In one embodiment, the planning module causes a display to generate the graphic interface as an output based on the data.

In one embodiment, the perception module periodically queries a plurality of areas of interest within a predetermined distance from the vehicle, and periodically provides occlusion information associated with the plurality of areas of interest to the planning circuit based on periodically querying the plurality of areas of interest. In one embodiment, the perception module filters out a first plurality of areas of interest from the plurality of areas of interest. A path extending from each of the first plurality of areas of interest along a corresponding lane direction interacts paths being different from a current route of the vehicle. The perception module publishes occlusion information associated with a second plurality of areas of interest to the planning module. The second plurality of areas of interest are areas of interest included in the plurality of areas of interest and different from the first plurality of areas of interest.

In one embodiment, the perception module identifies occupancy data associated with the at least one area of interest, e.g., from the occlusion map or an occupancy map. The occupancy data includes occlusion data and/or non-occlusion data. The perception module determines a respective level of occupancy for each of the plurality of lane segments based on the occupancy data associated with the at least one area of interest, and provides occupancy information comprising the respective levels of occupancy for the plurality of lane segments to the planning module.

The planning module generates a planned route based on the occlusion information from the perception module. The control module 1510 operates the vehicle in accordance with the planned route. In one embodiment, as illustrated in FIG. 13, the perception module receives the planned route (e.g., the planned route 1325) of the vehicle from the planning module and updates the at least one area of interest for the vehicle on the planned route.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   obtaining, by one or more processors, area information of at least one area of interest for a vehicle;
   identifying, by the one or more processors, occlusion data associated with the at least one area of interest;
   determining, by the one or more processors, occlusion information associated with the at least one area of interest based on the area information of the at least one area of interest and the occlusion data associated with the at least one area of interest, the occlusion information having a smaller data size than the occlusion data, wherein determining the occlusion information comprises
      determining a respective level of occlusion for each of a plurality of partitioned segments associated with the at least one area of interest, the plurality of partitioned segments comprising lane segments of one or more lanes associated with the at least one area of interest, the lane segments being sorted along at least one lane direction of the one or more lanes wherein the respective level of occlusion represents a confidence level of occlusion;
   updating, by the one or more processors, the occlusion information based on a velocity attribute and a direction attribute of at least one occluded object in the at least one area of interest, wherein updating the occlusion information comprises
      updating at least one respective level of occlusion of at least one partitioned segment of the plurality of partitioned segments according to a motion of the at least one occluded object in the at least one area of interest, the motion being based on the velocity attribute of the at least one occluded object;
   planning, by the one or more processors, a route for the vehicle according to the updated occlusion information; and
   controlling, by the one or more processors, the vehicle to move in accordance with the planned route.

2. The method of claim 1, wherein obtaining the area information of the at least one area of interest comprises:
   obtaining discretized reference path points along the at least one lane direction corresponding to the at least one area of interest, and
   wherein determining the occlusion information associated with the at least one area of interest further comprises:
      determining the occlusion information associated with the at least one area of interest based on the discretized reference path points.

3. The method of claim 2, wherein
   each of the lane segments comprises at least one discretized reference path point of the discretized reference path points.

4. The method of claim 3, further comprising:
   determining, by the one or more processors, occupancy data associated with the at least one area of interest;
   determining, by the one or more processors, a respective level of occupancy for each of the plurality of partitioned segments based on the occupancy data associated with the at least one area of interest; and
   planning, by the one or more processors, the route for the vehicle further according to occupancy information comprising the respective levels of occupancy for the plurality of partitioned segments.

5. The method of claim 2, wherein obtaining the area information of the at least one area of interest further comprises:
   obtaining the area information of the at least one area of interest from a mapping database.

6. The method of claim 2, wherein obtaining the area information of the at least one area of interest further comprises:
   generating the area information of the at least one area of interest based on mapping data from a mapping database.

7. The method of claim 6, wherein generating the area information of the at least one area of interest comprises:
   determining an intersection point between a current route of the vehicle and an area of interest of the at least one area of interest or an extension of the area of interest along a lane direction; and
   determining, from the intersection point, a series of discretized reference path points of the discretized reference path points along a direction opposite to the lane direction within the area of interest.

8. The method of claim 1, further comprising:
   generating, by the one or more processors, a graphic interface based on the plurality of partitioned segments and the respective levels of occlusion.

9. The method of claim 1, wherein determining the occlusion information further comprises:
   determining at least one level of occlusion for at least one representative shape corresponding to the at least one occluded object within the at least one area of interest.

10. The method of claim 1, wherein identifying the occlusion data associated with the at least one area of interest comprises:
    querying a representative element within the at least one area of interest; and
    obtaining the occlusion data based on the representative element.

11. The method of claim 1, wherein the occlusion information is updated by applying a temporal filtering algorithm to the occlusion data.

12. The method of claim 1, further comprising:
    updating the at least one area of interest for the vehicle based on the planned route.

13. The method of claim 1, further comprising:
periodically querying a plurality of areas of interest within a predetermined distance from the vehicle; and
periodically planning the route for the vehicle based on occlusion information associated with the plurality of areas of interest based on periodically querying the plurality of areas of interest.

14. The method of claim 13, further comprising:
filtering out a first plurality of areas of interest from the plurality of areas of interest when a path extending from each of the first plurality of areas of interest along a corresponding lane direction interacts with one or more other paths different from a current route of the vehicle; and
planning the route for the vehicle based on occlusion information associated with a second plurality of areas of interest, the second plurality of areas of interest being areas of interest included in the plurality of areas of interest and different from the first plurality of areas of interest.

15. The method of claim 1, further comprising:
determining the at least one area of interest to be at least one precedence area associated with an intersection in a current route for the vehicle.

16. The method of claim 15, wherein obtaining the area information of the at least one area of interest comprises obtaining at least one of:
an identifier of a lane corresponding to the at least one precedence area, or
an identifier of a lane connector corresponding to the at least one precedence area.

17. The method of claim 1, further comprising: determining the at least one area of interest to be at least one stop area associated with a stop line in a current route for the vehicle,
wherein determining the occlusion information further comprises:
determining a level of occlusion of the at least one stop area.

18. The method of claim 1, wherein obtaining the area information of the at least one area of interest comprises: obtaining a respective unique identifier for each area of interest among a plurality of areas, and
wherein the method further comprises:
providing the respective unique identifier for each area of interest, together with occlusion information corresponding to each area of interest, for planning the route for the vehicle.

19. A device comprising:
one or more computer processors; and
one or more non-transitory storage media storing instructions which, when executed by the one or more computer processors, cause performance of operations comprising:
obtaining area information of at least one area of interest for a vehicle;
identifying occlusion data associated with the at least one area of interest;
determining occlusion information associated with the at least one area of interest based on the area information of the at least one area of interest and the occlusion data associated with the at least one area of interest, the occlusion information having a smaller data size than the occlusion data, wherein determining the occlusion information comprises
determining a respective level of occlusion for each of a plurality of partitioned segments associated with the at least one area of interest, the plurality of partitioned segments comprising lane segments of one or more lanes associated with the at least one area of interest, the lane segments being sorted along at least one lane direction of the one or more lanes, wherein the respective level of occlusion represents a confidence level of occlusion;
updating the occlusion information based on a velocity attribute and a direction attribute of at least one occluded object in the at least one area of interest, wherein updating the occlusion information comprises
updating at least one respective level of occlusion of at least one partitioned segment of the plurality of partitioned segments according to a motion of the at least one occluded object in the at least one area of interest, the motion being based on the velocity attribute of the at least one occluded object;
planning a route for the vehicle according to the updated occlusion information; and
controlling the vehicle to move in accordance with the planned route.

20. One or more non-transitory storage media storing instructions which, when executed by one or more computing devices, cause performance of operations comprising:
obtaining area information of at least one area of interest for a vehicle;
identifying occlusion data associated with the at least one area of interest;
determining occlusion information associated with the at least one area of interest based on the area information of the at least one area of interest and the occlusion data associated with the at least one area of interest, the occlusion information having a smaller data size than the occlusion data, wherein determining the occlusion information comprises
determining a respective level of occlusion for each of a plurality of partitioned segments associated with the at least one area of interest, the plurality of partitioned segments comprising lane segments of one or more lanes associated with the at least one area of interest, the lane segments being sorted along at least one lane direction of the one or more lanes, wherein the respective level of occlusion represents a confidence level of occlusion;
updating the occlusion information based on a velocity attribute and a direction attribute of at least one occluded object in the at least one area of interest, wherein updating the occlusion information comprises
updating at least one respective level of occlusion of at least one partitioned segment of the plurality of partitioned segments according to a motion of the at least one occluded object in the at least one area of interest, the motion being based on the velocity attribute of the at least one occluded object;
planning a route for the vehicle according to the updated occlusion information; and
controlling the vehicle to move in accordance with the planned route.

* * * * *